US011127144B2

(12) United States Patent
Steiner

(10) Patent No.: US 11,127,144 B2
(45) Date of Patent: Sep. 21, 2021

(54) OCCUPANT COUNTING DEVICE

(71) Applicant: Lutron Technology Company LLC, Coopersburg, PA (US)

(72) Inventor: James P. Steiner, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 207 days.

(21) Appl. No.: 16/549,984

(22) Filed: Aug. 23, 2019

(65) Prior Publication Data

US 2020/0082551 A1 Mar. 12, 2020

Related U.S. Application Data

(60) Provisional application No. 62/783,525, filed on Dec. 21, 2018, provisional application No. 62/722,555, filed on Aug. 24, 2018.

(51) Int. Cl.
*G06K 9/00* (2006.01)
*G06T 7/277* (2017.01)
(Continued)

(52) U.S. Cl.
CPC ............ *G06T 7/277* (2017.01); *G01S 5/0294* (2013.01); *G01S 13/867* (2013.01); *G06T 7/136* (2017.01); *G06T 7/215* (2017.01)

(58) Field of Classification Search
CPC ......... G06T 7/277; G06T 7/136; G06T 7/215; G06T 2207/10016; G01S 5/0294;
(Continued)

(56) References Cited

U.S. PATENT DOCUMENTS 4,799,243 A 1/1989 Zepke
5,248,919 A 9/1993 Hanna et al.
(Continued)

FOREIGN PATENT DOCUMENTS

CN 2596671 Y 12/2003
GB 2278437 A 11/1994
(Continued)

OTHER PUBLICATIONS

Bahadori, S. , et al., "Towards Ambient Intelligence for the Domestic Care of the Elderly", Progetto RoboCare; RoboCare Technical Report N. 3, Jul. 7, 2004 00:00:00.0, 27 pages.

*Primary Examiner* — Mahendra R Patel
(74) *Attorney, Agent, or Firm* — Flaster Greenberg, P.C.

(57) ABSTRACT

A sensor may be configured to determine how many people that have entered or exited a space. The sensor may comprise a pyroelectric infrared (PIR) detection circuit capable of generating different output signal patterns in response to a person entering or exiting the space. The sensor may determine whether the person has entered or exited the space based on the output signal pattern. The sensor may include a thermopile array, a radar detection circuit, or a visible light sensing circuit. The thermopile array, radar detection circuit, or visible light sensing circuit may be capable of detecting a person's location and/or movements within an area monitored by the sensor and determining, based on the detected movements, whether the person has entered or left the space. An occupant count of the space may then be determined accordingly by the sensor or by a system controller.

27 Claims, 13 Drawing Sheets

(51) Int. Cl.
*G06T 7/136* (2017.01)
*G06T 7/215* (2017.01)
*G01S 5/02* (2010.01)
*G01S 13/86* (2006.01)

(58) Field of Classification Search
CPC ..... G01S 13/867; Y02B 20/40; H05B 47/105; H05B 47/11; H05B 47/115; G06K 9/00771
USPC .......................................................... 382/108
See application file for complete search history.

(56) References Cited

U.S. PATENT DOCUMENTS

| | | | |
|---|---|---|---|
| 5,264,761 | A | 11/1993 | Johnson et al. |
| 5,291,020 | A | 3/1994 | Lee |
| 7,391,297 | B2 | 6/2008 | Cash et al. |
| 7,834,856 | B2 | 11/2010 | Grinshpoon et al. |
| 7,940,167 | B2 | 5/2011 | Steiner et al. |
| 8,009,042 | B2 | 8/2011 | Steiner et al. |
| 8,108,055 | B2 | 1/2012 | Wong |
| 8,199,010 | B2 | 6/2012 | Sloan et al. |
| 8,228,184 | B2 | 7/2012 | Blakeley et al. |
| 8,823,551 | B1* | 9/2014 | Hoffman .................. G08G 1/04 340/932.2 |
| 8,950,461 | B2 | 2/2015 | Ogden et al. |
| 9,208,965 | B2 | 12/2015 | Busby et al. |
| 9,418,802 | B2 | 8/2016 | Romano et al. |
| 9,488,000 | B2 | 11/2016 | Kirby et al. |
| 9,520,247 | B1 | 12/2016 | Finnegan et al. |
| 9,538,603 | B2 | 1/2017 | Abraham et al. |
| 9,571,986 | B2 | 2/2017 | Gottschalk et al. |
| 9,583,288 | B2 | 2/2017 | Jones et al. |
| 9,676,696 | B2 | 6/2017 | Hakozaki |
| 9,799,469 | B2 | 10/2017 | Bailey et al. |
| 9,867,259 | B2 | 1/2018 | Weidman |
| 9,959,997 | B2 | 5/2018 | Bailey et al. |
| 10,152,628 | B2* | 12/2018 | Townsend .......... G06K 9/00718 |
| 2004/0156530 | A1* | 8/2004 | Brodsky .................. G06K 9/32 382/103 |
| 2007/0188318 | A1* | 8/2007 | Cole ...................... G06Q 10/08 340/539.13 |
| 2008/0092075 | A1 | 4/2008 | Jacob et al. |
| 2009/0154768 | A1* | 6/2009 | Bell .................... G06K 9/00771 382/103 |
| 2009/0171478 | A1 | 7/2009 | Wong |
| 2009/0206983 | A1 | 8/2009 | Knode et al. |
| 2012/0292174 | A1 | 11/2012 | Mah et al. |
| 2012/0327179 | A1* | 12/2012 | Watson ............... H04N 5/23299 348/14.08 |
| 2013/0006517 | A1* | 1/2013 | Ofek .................. G01C 21/3484 701/411 |
| 2013/0030589 | A1 | 1/2013 | Pessina et al. |
| 2013/0234844 | A1* | 9/2013 | Yopp ...................... B60Q 9/008 340/435 |
| 2014/0265568 | A1 | 9/2014 | Crafts et al. |
| 2015/0077021 | A1 | 3/2015 | McCarthy et al. |
| 2015/0180237 | A1 | 6/2015 | Steiner et al. |
| 2015/0268329 | A1* | 9/2015 | Yannone ................. G01S 11/02 342/13 |
| 2015/0371534 | A1 | 12/2015 | Dimberg et al. |
| 2016/0033336 | A1* | 2/2016 | Halverson ............. G01J 5/0265 348/82 |
| 2016/0056629 | A1 | 2/2016 | Baker et al. |
| 2016/0073479 | A1 | 3/2016 | Erchak et al. |
| 2017/0105176 | A1 | 4/2017 | Finnegan et al. |
| 2017/0116487 | A1* | 4/2017 | Yamazaki ............... G06T 7/285 |
| 2017/0117108 | A1 | 4/2017 | Richardson et al. |
| 2017/0171941 | A1* | 6/2017 | Steiner .................. H05B 47/115 |
| 2017/0327344 | A1* | 11/2017 | Richmond ............ B66B 5/0012 |
| 2018/0167547 | A1 | 6/2018 | Casey |
| 2018/0168019 | A1 | 6/2018 | Baker et al. |
| 2018/0190451 | A1 | 7/2018 | Scruggs |
| 2018/0239965 | A1* | 8/2018 | Aggarwal .......... G06K 9/00771 |
| 2018/0285650 | A1* | 10/2018 | George ............. G06K 9/00771 |
| 2018/0321687 | A1* | 11/2018 | Chambers ............... G06F 16/29 |
| 2018/0376243 | A1* | 12/2018 | Nagel .................... H04R 1/028 |

FOREIGN PATENT DOCUMENTS

| | | |
|---|---|---|
| JP | 2006112851 A | 4/2006 |
| WO | 2016065154 A1 | 4/2016 |

* cited by examiner

OCCUPANT COUNTING DEVICE

CROSS-REFERENCE TO RELATED APPLICATIONS

This application claims the benefit of Provisional U.S. Patent Application No. 62/722,555, filed Aug. 24, 2018, and Provisional U.S. Patent Application No. 62/783,525, filed Dec. 21, 2018, the disclosures of which are incorporated herein by reference in their entireties.

BACKGROUND

To manage a user environment, such as a residence or an office building, it may be desirable to have the ability to estimate the number of people occupying the user environment at a given time. Knowing the number of the people in an environment may improve occupant-driven control measures, such as energy control, air quality control, room assignment and/or scheduling, and/or the like. Prior art occupant counting methods and devices suffer from poor accuracy and/or high costs, and often cause privacy concerns.

SUMMARY

Sensor devices are described herein for determining a count of occupants (e.g., an occupant count) in a space. A sensor device be installed near the space to detect movements (e.g., occupant movements) in the proximity of the device. For example, the sensor device may be installed in a doorway and/or entranceway of the space to detect occupants entering and/or exiting the space.

The control circuit may maintain an occupant count for the space by increasing the count upon determining that a person has entered the space and decreasing the count upon determining that a person has exited the space. The sensor device may further comprise a communication circuit, which may be used to transmit a signal (e.g., a digital message) indicating the occupant count. The signal may be transmitted to a system controller or to another device with similar occupant counting capabilities. The sensor device may reset the occupant count to zero after transmitting the signal, for example, to prevent any miscount from propagating. The system controller may be configured to receive occupant count data (e.g., entrance/exit count data) from the sensor device and maintain an occupant count for the space. For example, the system controller may be configured to receive occupant count data from multiple sensor devices and maintain a total occupant count for the space.

The system controller may also be configured to obtain information about the occupancy condition of the space from an occupancy sensor. The system controller may compare the occupant count reported by the sensor device against the occupancy condition indicated by the occupancy sensor, and resolve mismatches between the two pieces of information. For example, if the occupant count reported by the sensor device is greater than zero but the occupancy sensor indicates that the space is unoccupied, the system controller may reset the occupant count to zero.

A sensor device may include a detection circuit, such as a pyroelectric infrared (PIR) detection circuit, and a control circuit. The PIR detection circuit may comprise a plurality of PIR elements connected in an anti-series configuration. The PIR elements may be responsive to a person's movement in a detection zone and the PIR detection circuit may generate output signals with different patterns corresponding to different directions of the movement. The control circuit may, in response to a detected movement of a person, collect a plurality of samples from the output of the PIR detection circuit. From the plurality of samples, the control circuit may identify a first sample and a second sample having opposite polarities and magnitudes that are above a certain threshold. Based on the pattern demonstrated by the plurality of samples such as the order in which the first and second sample signals were generated, the control circuit may determine whether the person has entered the space or exited the space.

A sensor device may include a thermopile array (e.g., a plurality of heat-sensitive elements arranged in an N×N array). The heat-sensitive elements may be responsive to thermal energy in a two-dimensional area and may produce signals representing a heat map or two-dimensional (2D) thermal image of the area. The control circuit may receive the signals from the thermopile array, determine the location of an energy-emitting object in the 2D area by processing the signals, and further determine movements of the energy-emitting object through a plurality of zones of the area. Based on these movements, the control circuit may determine whether the energy-emitting object has entered the space or left the area. A sensor device may include a radar sensing circuit, a visible light sensing circuit, and/or a time-of-flight sensing circuit (e.g., instead of or in addition to the thermopile array). The radar sensing circuit, the visible light sensing circuit, and/or the time-of-flight sensing circuit may function in similar manners as the thermopile array, at least with respect to having the ability to determine the location and/or movements of an object in an area monitored by the radar sensing circuit, the visible light sensing circuit, or the time-of-flight sensing circuit.

DETAILED DESCRIPTION

Figure 1:
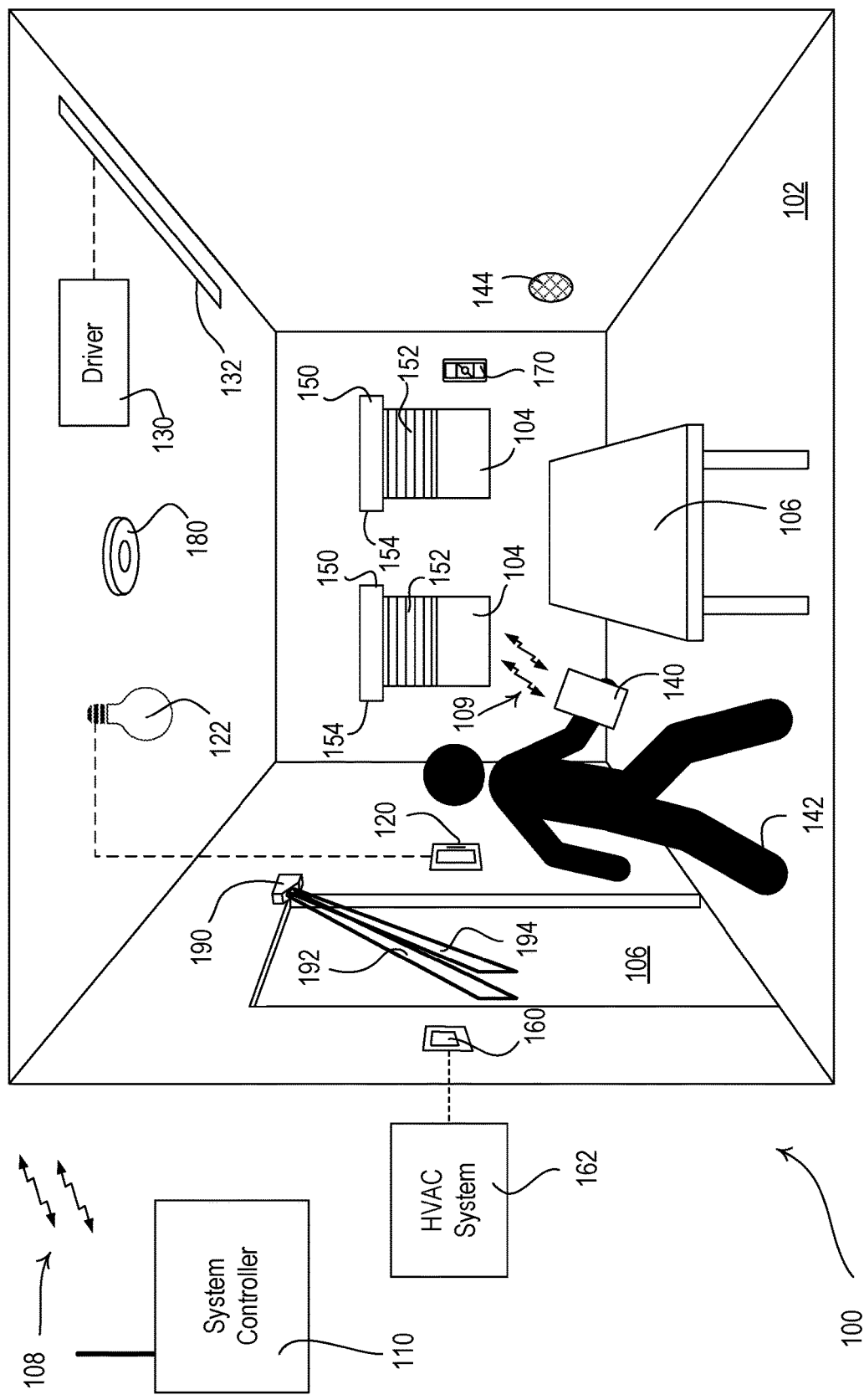
FIG. 1 is a simple diagram of an example load control system including one or more occupant counting devices and occupancy sensors.

FIG. 1 is a simple diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device.

The control-source devices may be configured to transmit digital messages directly to the control-target devices. In addition, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The control-source and control-target devices and the system controller 110 may be configured to transmit and receive the RF signals 108 using a proprietary RF protocol, such as the ClearConnect® protocol. The RF signals 108 may also be transmitted using other RF protocols, such as, a standard protocol, for example, one of WIFI, ZIGBEE, Z-WAVE, KNX-RF, ENOCEAN RADIO protocols, or a different proprietary protocol.

The load control system 100 may comprise one or more load control devices, e.g., a dimmer switch 120 for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which may be arranged in a linear array and are illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Pat. No. 9,676,696, issued Jun. 13, 2017, entitled WIRELESS LOAD CONTROL DEVICE, the entire disclosures of which are hereby incorporated by reference.

The dimmer switch 120 may be configured to wirelessly receive digital messages via the RF signals 108 (e.g., from the system controller 110) and to control the lighting load 122 in response to the received digital messages. Examples of dimmer switches operable to transmit and receive digital messages is described in greater detail in commonly-assigned U.S. Patent Application Publication No. 2009/0206983, published Aug. 20, 2009, entitled COMMUNICATION PROTOCOL FOR A RADIO-FREQUENCY LOAD CONTROL SYSTEM, the entire disclosure of which is hereby incorporated by reference.

The load control system 100 may comprise one or more remotely-located load control devices, such as a light-emitting diode (LED) driver 130 for driving an LED light source 132 (e.g., an LED light engine). The LED driver 130 may be located remotely, for example, in or adjacent to the lighting fixture of the LED light source 132. The LED driver 130 may be configured to receive digital messages via the RF signals 108 (e.g., from the system controller 110) and to control the LED light source 132 in response to the received digital messages. The LED driver 130 may be configured to adjust the color temperature of the LED light source 132 in response to the received digital messages. Examples of LED drivers configured to control the color temperature of LED light sources are described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference. The load control system 100 may further comprise other types of remotely-located load control devices, such as, for example, electronic dimming ballasts for driving fluorescent lamps.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive digital messages via the RF signals 108 (e.g., from the system controller 110) and adjust the position of the respective window treatment fabric 152 in response to the received digital messages. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COM- PARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate digital messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive digital messages via the RF signals 108 (e.g., from the system controller 110) and adjust heating, ventilation, and cooling in response to the received digital messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a remote control device 170, an occupancy sensor 180, or an occupant counting device (e.g., an occupant counting sensor 190). The input devices may be fixed or movable input devices. The system controller 110 may be configured to transmit one or more digital messages to the load control devices (e.g., the dimmer switch 120, the LED driver 130, the motorized window treatments 150, and/or the thermostat 160) in response to the digital messages received from the remote control device 170, the occupancy sensor 180, and/or the occupant counting sensor 190. The remote control device 170, the occupancy sensor 180 and/or the occupant counting sensor 190 may be configured to transmit digital messages directly to the system controller 110, the dimmer switch 120, the LED driver 130, the motorized window treatments 150, and/or the thermostat 160.

The remote control device 170 may be configured to transmit digital messages via the RF signals 108 to the system controller 110 (e.g., directly to the system controller) in response to an actuation of one or more buttons of the remote control device. For example, the remote control device 170 may be battery-powered.

The occupancy sensor 180 may be configured to detect occupancy and vacancy conditions in the room 102. The occupancy sensor 180 may be an infrared sensor (e.g., a passive infrared sensor). The occupancy sensors 180 may be removably mountable to a ceiling or a wall. Although only one occupancy sensor is shown in FIG. 1, a skilled person in the art would recognize that the load control system 100 may include more than one occupancy sensor spaced apart to detect occupancy conditions in different areas of the room 102. The occupancy sensor 180 may include an internal detector such as a pyroelectric infrared (PIR) detector, an ultrasonic detector, a microwave detector, or any combination of thereof. For example, the internal PIR detector may be housed in an enclosure comprising a lens (e.g., an outwardly domed lens) provided in a front surface of the enclosure. The internal PIR detector may be operable to receive energy (e.g., infrared energy) emitted from an occupant in the space via the lens to thus sense the occupancy condition in the space. The occupancy sensor 180 may be operable to process the output of the PIR detector to determine whether an occupancy condition or a vacancy condition is presently occurring in room 102, for example, by comparing the output of the internal detector to a predetermined occupancy voltage threshold.

The occupancy sensor 180 may transmit digital messages to the system controller 110 via the RF signals 108 (e.g., using the proprietary protocol described herein) in response to detecting the occupancy or vacancy conditions. The system controller 110 may be configured to transmit commands to the respective load control devices to turn the respective lighting loads (e.g., lighting load 122 and/or the LED light source 132) on or off in response to receiving an occupied command or a vacant command, respectively. The system controller 110 may be configured to adjust (e.g., correct inaccuracies of) an occupant count submitted by the occupant counting sensor 190 based on the occupancy or vacancy conditions detected by the occupancy sensor 180 (e.g., as will be described in greater detail below). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The occupancy sensor 180 may additionally or alternatively comprise a visible light sensing circuit, such as a camera and/or an image processing circuit. The camera may be directed into the room 102 and may be configured to record images of the room 102. The occupancy sensor 180 may be configured to detect occupancy and vacancy conditions using the recorded images of the image. Examples of sensors comprising visible light sensing circuits are described in greater detail in commonly-assigned U. S Patent Application Publication No. 2017/0171941, published Jun. 15, 2017, and U.S. Patent Application Publication No. 2018/0168019, published Jun. 14, 2018, both entitled LOAD CONTROL SYSTEM HAVING A VISIBLE LIGHT SENSOR, the entire disclosures of which are hereby incorporated by reference.

The load control system 100 may comprise other types of input devices, such as, for example, temperature sensors, humidity sensors, radiometers, cloudy-day sensors, shadow sensors, pressure sensors, smoke detectors, carbon monoxide detectors, carbon dioxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 140, such as, a personal computing device and/or a wearable wireless device. The mobile device 140 may be located on an occupant 142 (e.g., may be attached to the occupant's body or clothing or may be held by the occupant). The mobile device 140 may be characterized by a unique identifier (e.g., a serial number or address stored in memory) that uniquely identifies the mobile device 140 and thus the occupant 142. Examples of personal computing devices may include a smart phone (for example, an iPhone® smart phone, an Android® smart phone, or a Blackberry® smart phone), a laptop, and/or a tablet device (for example, an iPad® handheld computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 140 may be configured to transmit digital messages to the system controller 110, for example, in one or more Internet Protocol packets. For example, the mobile device 140 may be configured to transmit digital messages to the system controller 110 over the LAN and/or via the internet. The mobile device 140 may be configured to transmit digital messages over the internet to an external service (e.g., If This Then That (IFTTT®) service), and then the digital messages may be received by the system controller 110. The mobile device 140 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof. Alternatively or additionally, the mobile device 190 may be configured to transmit RF signals according to the proprietary protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 110 may be configured to determine the location of the mobile device 140 and/or the occupant 142. The system controller 110 may be configured to control (e.g., automatically control) the load control devices (e.g., the dimmer switch 120, the LED driver 130, the motorized window treatments 150, and/or the temperature control device 160) in response to determining the location of the mobile device 140 and/or the occupant 142. One or more of the control devices of the load control system 100 may transmit beacon signals, for example, RF beacon signals transmitted using a short-range and/or low-power RF technology, such as Bluetooth technology. The load control system 100 may also comprise at least one beacon transmitting device 144 for transmitting the beacon signals. The mobile device 140 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 140. The mobile device 140 may be configured to transmit the unique identifier to the system controller 110, which may be configured to determine the location of the mobile device 140 using the unique identifier (e.g., using data stored in memory or retrieved via the Internet). An example of a load control system for controlling one or more electrical loads in response to the position of a mobile device and/or occupant inside of a building is described in greater detail in commonly-assigned U.S. Patent Application Publication No. 2016/0056629, published Feb. 25, 2016, entitled LOAD CONTROL SYSTEM RESPONSIVE TO LOCATION OF AN OCCUPANT AND MOBILE DEVICES, the entire disclosure of which is hereby incorporated by reference.

The operation of the load control system 100 may be programmed and configured using, for example, the mobile device 140 or other network device (e.g., when the mobile device is a personal computing device). The mobile device 140 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the motorized window treatments 150, and/or the thermostat 160). The load control database may comprise information regarding associations between the load control devices and the input devices (e.g., the remote control device 170, the occupancy sensor 180, the occupant counting sensor 190, etc.). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The occupant counting sensor 190 may be capable of detecting when a person enters or exits the room 102. The occupant counting sensor 190 may comprise a plurality of PIR elements (e.g., two PIR detectors). These elements may comprise pyroelectric materials that are sensitive to heat (e.g., infrared radiation). The elements may be arranged in anti-series connection such that the responses (e.g., output voltages) of the individual PIR elements to heat-emitting bodies (e.g., people entering or exiting the room 102) are opposite in polarity, e.g., to cancel out spurious noise. Additionally, the anti-series connection makes it possible to identify which individual PIR element produces a response first (e.g., detect a change in infrared energy first). Such characteristics of the PIR elements may be utilized to determine the direction of motion associated with a person and in turn to determine whether the person has entered or exited room 102. For example, when a person enters room 102, his/her movement may be detected as motion in one direction. When the person exits the room, his/her motion may be determined to be in an opposite direction. Based on the motion (and the entry/exit status of the person derived therefrom), the occupant counting sensor 190 may be configured to determine an occupant count and/or a change in the occupant count of the room 102 by increasing the occupant count when a person enters the room and decreasing the occupant count when a person leaves the room.

The occupant counting sensor 190 may be mounted and oriented to detect an energy (e.g., IR energy) emitting body moving through the doorway. As shown in FIG. 1, the occupant counting sensor 190 may be mounted above a corner (e.g., an upper corner) of a doorway 106 to room 102, although other places of installation are also possible. For example, the occupant counting sensor 190 may be mounted to a lower corner of the doorway 106, to a middle side of the doorway, to the left side or the right side of the doorway, and/or to the inside or outside of the doorway. In addition, the occupant counting sensor 190 may be mounted to a door frame around the door, inside of the door frame, and/or otherwise mounted to the structure surrounding the door to appropriately detecting an occupant moving through the doorway 106. In addition, multiple occupant counting sensors may be mounted to various locations on the doorway 106 to improve the accuracy of the detection of people entering or exiting the room 102.

The occupant counting sensor 190 may comprise a focusing device, such as a lens (e.g., a Fresnel lens), that may be configured to focus the IR energy from the occupant onto the PIR elements. The lens may serve multiple purposes including, for example, enhancing the accuracy of motion detection of the occupant counting sensor 190 and/or extending its range of detection. For example, a Fresnel lens may capture more IR radiation and focus it onto a small point (e.g., inside of the occupant counting sensor 190 at the PIR elements), thus extending the range of detection of the occupant counting sensor 190. This focal point may move across the PIR elements of the occupant counting sensor 190 as the IR source moves and may expose one set of PIR elements of the occupant counting sensor 190 to the focal point at a time, triggering the generation of patterned output signals as described herein.

As shown in FIG. 1, a first one of the PIR elements of the occupant counting sensor 190 may detect movement in a first area 192 and a second one of the PIR elements may detect movement in a second area 194. For example, occupant counting sensor 190 may be positioned and/or oriented such that the first and second areas 192, 194 cross the chest of the occupant as the occupant is entering and/or exiting the room 102 through the doorway 106. As an occupant is moving into the room, the first one of the PIR elements may detect movement in the first area 192 before the second one of the PIR elements detects movement in the second area 194. The output signals generated by the PIR elements may indicate motion in a specific direction. For example, if the output includes a positive peak followed by a negative peak, the occupant counting sensor 190 may determine that a person has entered room 102. If the output includes a negative peak followed by a positive peak, the occupant counting sensor 190 may determine that a person has left room 102. It should be noted that the respective patterns that correspond the entry/exit determinations may vary based on the orientation of installation of the occupant counting sensor.

The occupant counting sensor 190 may comprise a switch (not shown) that may be manipulated to inform the occupant counting sensor 190 about the orientation of the installation (e.g., whether the occupant counting sensor is mounted to left or right side of the doorway 106 and/or inside or outside of the doorway). Based on the orientation, the occupant counting sensor 190 may know which specific output signal pattern corresponds to which direction of movement. For example, when the occupant counting sensor 190 is installed with a first orientation, the sensor may associate a positive-negative peak signal pattern with a person entering room 102. When the occupant counting sensor 190 is installed with a second orientation, the sensor may associate the positive-negative peak signal pattern with a person leaving room 102.

The occupant counting sensor 190 may comprise other types of detection circuits. For example, the occupant counting sensor 190 may comprise a thermopile array such as an N×N array of heat-responsive elements configured to generate a two-dimensional thermal image of an coverage area of the room 102. The occupant counting sensor 190 may comprise a radar sensing device that utilizes a transmitting antenna array (e.g., a phased array) and/or a receiving antenna array (e.g., a phased array) to record radar images of the entry location. The occupant counting sensor 190 may comprise a visible light sensing device that utilizes a camera directed to an entry location of the room 102 to record images of the entry location. The occupant counting sensor 190 may comprise a time-of-flight sensing circuit capable of providing a three-dimensional image of an area of the room 102. The images generated by these detection circuits may be processed to determine the location and/or movement of an occupant in an area of the room 102 in order to determine whether the occupant has entered or exited the room 102. For example, using a heat map (e.g., a 2D thermal image) generated by a thermopile array, a control circuit of the occupant counting sensor 190 may track the movements of an occupant through multiple zones of a coverage area (e.g., near a doorway) so that the control circuit may determine, based on the pattern and/or direction of the movements, whether the occupant is entering or leaving the room 102. Examples of image-based detection circuits will be described in greater detail below.

The occupant counting sensor 190 may transmit one or more digital messages to the system controller 110 via the RF signals 108 (e.g., using the proprietary protocol described herein) in response to determining an occupant count of the room 102 or detecting a change in the occupant count. The digital messages may indicate the occupant count or a change thereof. For example, the occupant counting sensor 190 may be a one-way transmitter (e.g., may not be configured to receive digital messages), and may be configured to transmit (e.g., periodically transmit) a sensor occupant count that indicates the changes in the occupant count since the last transmission from the occupant counting sensor 190. The occupant counting sensor 190 may be configured to reset the occupant count stored in memory at the occupant counting sensor after the occupant counting sensor transmits the change in occupant count. For example, the sensor occupant count may be either positive or negative based on how many occupants enter or exit the room 102 since the last reset of the occupant count. The system controller 110 may be configured to maintain the occupant count for the room 102 (e.g., a room occupant count). For example, the system controller 110 may add the sensor occupant count (e.g., that indicates the changes in the occupant count detected by that particular occupant counting sensor) to the room occupant count each time that the system controller 110 receives the sensor occupant count from the occupant counting sensor 190.

Based on the room occupant count, the system controller 110 may be further configured to determine an occupancy condition and/or a vacancy condition of the room. For example, when the room occupant count is greater than zero, the system controller 110 may determine that the room 102 is occupied, and when the room occupant count reaches zero, the system controller 110 may determine that the room 102 is vacant.

The system controller 110 may be configured to process the digital messages and take various actions based on the digital messages and/or other information gathered from the load control system 100. For example, the system controller 110 may determine, based on the digital messages, that there is a mismatch between the room occupant count as determined from the sensor occupant count received in the digital messages and an occupancy condition reported by the occupancy sensor 180. An example mismatch may occur, for instance, when the room occupant count of the room 102 as determined by the system controller 110 is greater than zero while the occupancy sensor 180 indicates that the room is unoccupied. The system controller 110 may be configured to resolve such a mismatch, for example, by resetting the room occupant count as maintained by the system controller to zero. In addition, if the system controller 110 determines, based on digital messages transmitted by the first and second occupant counting sensors, that the occupant count is less than zero, the system controller 110 may reset the occupant count for the room 102 to zero.

The system controller 110 may be configured to gather and/or store room occupant count data over time (e.g., for multiple time periods) and thus maintain a historical record (e.g., a historical view) of the occupancy status and/or occupant count of a room. The historical record may comprise multiple data points each corresponding to a room occupant during a specific time period. The system controller 110 may be further configured to correct the historical record of occupancy status and/or occupant count of the room 102 in response to resolving a mismatch between the room occupant count as determined from the sensor occupant count received in the digital messages and an occupancy condition reported by the occupancy sensor 180. For example, if the room occupant count of the room 102 as determined by the system controller 110 is greater than zero while the occupancy sensor 180 indicates that the room is unoccupied, the system controller 110 may reset the room occupant count to zero and update the historical record of the occupancy status and/or occupant count of the room (e.g., reset one or more data points of the historical record corresponding to room occupant counts during various time periods to zero).

In examples, the system controller 110 may be configured to receive occupant count information from more than one occupant counting sensor associated with a room. For instance, in addition to the occupant counting sensor 190, the load control system 100 in FIG. 1 may include one or more additional occupant counting sensors installed in the proximity of other doorway(s) of the room 102. These additional occupant counting sensors may be configured to function similarly to the occupant counting sensor 190, and may provide additional information for determining the number of occupants in the room 102. For example, a first occupant counting sensor may be installed near an entrance to the room 102 and a second occupant counting sensor may be installed near an exit of the room. Both sensors may be capable of determining the number of people passing through the respective doorways during a time period and report the information to the system controller 110.

The system controller 110 may be configured to receive messages transmitted by the first and second occupant counting sensors and aggregate the occupant counts (or change thereof) indicated in those messages. For example, if the first occupant counting sensor indicates that three people have entered the room 102 during the time period and the second occupant counting sensor indicates that two people have left the room 102 during that same time period, the system controller 110 may decide that the number of people occupying the room 102 is one.

As described above, the system controller 110 may be capable of resolving mismatches between information reported by the occupant counting sensors and information gathered from other devices in the load control system 100. Using the example provided above, if the system controller 110 determines, based on digital messages transmitted by the first and second occupant counting sensors, that there is one occupant in the room 102, and that, according to the occupancy sensor 180, the room is unoccupied, the system controller 110 may reset the occupant count for the room 102 to zero.

The occupant counting sensor 190 may be a two-way wireless device and may be configured to both transmit and receive digital messages, e.g., to and from the system controller 110. The occupant counting sensor 190 may be configured to maintain a room occupant count (e.g., in addition to or instead of determining a sensor occupant count). For example, the occupant counting sensor 190 may be configured to periodically transmit the room occupant count (e.g., that indicates the number of occupants presently in the room to the system controller 110). When the occupant counting sensor 190 is configured to maintain the room occupant count, the system controller may resolve mismatches between information reported by the occupant counting sensors and information gathered from other devices in the load control system 100. For example, if the system controller 110 determines that there is one occupant in room 102, and that the room is unoccupied according to the occupancy sensor 180, the system controller 110 may transmit a digital message to the occupant counting sensor 190 to reset the occupant count for room 102 to zero.

The occupant counting sensor 190 may be configured to perform some or all of the functions of the system controller 110. For example, the occupant counting sensor 190 may be capable of receiving information (e.g., digital messages) from other occupant counting sensors and/or from the occupancy sensor 180 regarding an occupant count (or a change thereof) or an occupancy status of room 102. The occupant counting sensor 190 may be configured to process the received information in conjunction with the occupant count determined by the occupant counting sensor 190 itself, and derive a cumulative count of the number of occupants in room 102. Similar to the system controller 110, the occupant counting sensor 190 may be capable of resolving mismatches among various pieces of information received or derived by the occupant counting sensor 190.

Figure 2:
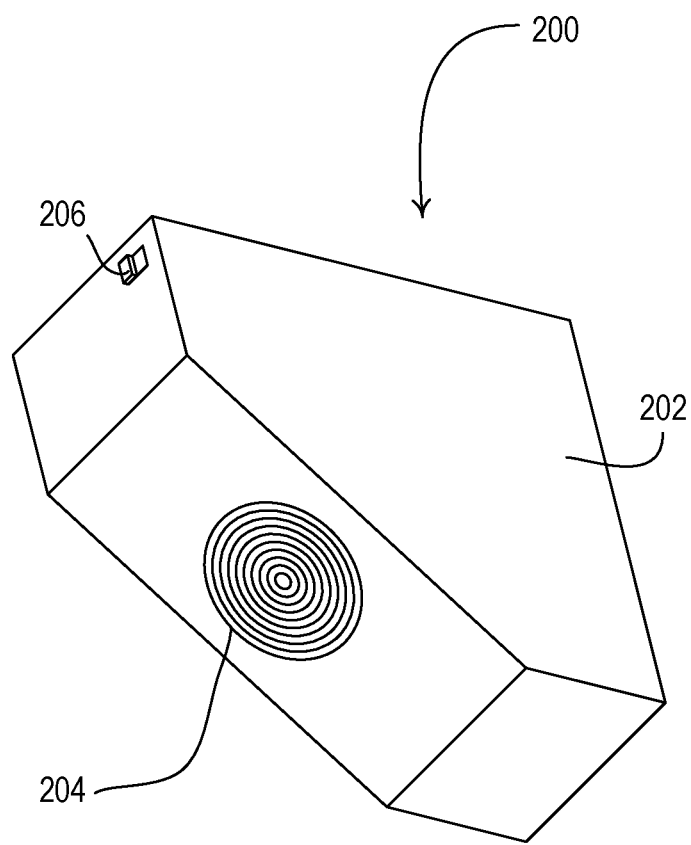
FIG. 2 is a perspective view of an example occupant counting sensor as described herein.

FIG. 2 is an enlarged perspective view of an example occupant counting sensor 200 (e.g., the occupant counting sensor 190 of FIG. 1). The occupant counting sensor 200 may comprise an enclosure 202 for housing the electrical circuitry of the occupant counting sensor. The electrical circuitry of the occupant counting sensor 200 may comprise a plurality of PIR elements (e.g., two PIR elements) capable of detecting energy (e.g., IR energy) from an energy-emitting body (e.g., an occupant) in a space. The PIR elements may be arranged and/or oriented to detect movement of the energy-emitting body in front of the occupant counting sensor 200 (e.g., to detect a person entering or exiting a room).

The occupant counting sensor 200 may comprise a focusing device, such as a Fresnel lens 204, configured to capture the energy of the energy-emitting body moving in front of the lens, and to focus the captured radiation onto a small point at the PIR elements, so as to enhance the range and/or accuracy of detection of the occupant counting sensor 200. The occupant counting sensor 200 may be installed in the proximity of a doorway of a user space (e.g., the room 102 shown in FIG. 1). For example, the occupant counting sensor 200 may be mounted at a corner (e.g., an upper corner) of a doorway and be oriented to face an opposite corner of the doorway. The orientation of the occupant counting sensor 200 may be indicated (e.g., signaled), for example, via an orientation actuator 206 of the occupant counting sensor. For example, setting the orientation actuator 206 to a first position may indicate to the occupant counting sensor 200 that the Fresnel lens 204 is installed in an upper left corner of the doorway (e.g., on the inside of the doorway) and pointing in a lower right direction while setting the orientation actuator 206 to a second position may indicate to the occupant counting sensor 200 that the Fresnel lens 204 is installed in an upper right corner of the doorway (e.g., on the inside of the doorway) and pointing in a lower left direction.

Figure 3A:
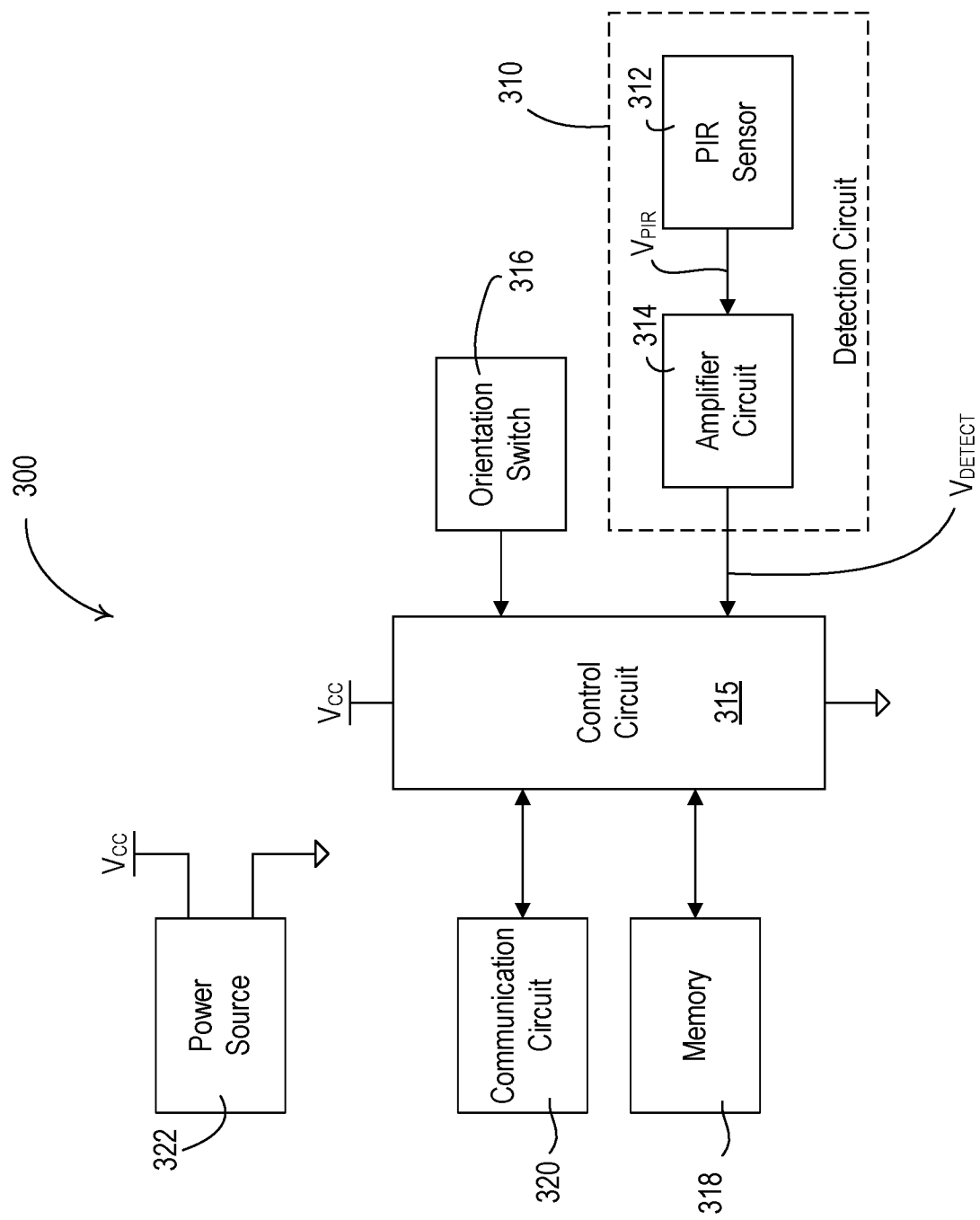
FIG. 3A is a block diagram of an example occupant counting sensor as described herein.

FIG. 3A is an example block diagram of an example occupant counting sensor 300 (e.g., the occupant counting sensor 190 of FIG. 1 and/or the occupant counting sensor 200 of FIG. 2). The occupant counting sensor 200 may comprise a detection circuit 310 configured to detect an occupant in a space (e.g., entering and/or exiting the space). For example, the detection circuit 310 may comprise a pyroelectric infrared (PIR) detector circuit 312 and an amplifier circuit 314. The PIR detection circuit 312 may include a plurality of PIR elements (e.g., two PIR elements) capable of detecting energy (e.g., IR energy) from an energy-emitting body (e.g., an occupant) in a space and generating a PIR voltage $V_{PIR}$. The occupant counting sensor 300 may comprise a focusing device (e.g., the Fresnel lens 204 shown in FIG. 2) configured to capture the energy of the energy-emitting body moving in front of the lens, and to focus the captured radiation onto the PIR elements of the PIR detector circuit 312. The amplifier circuit 314 may be coupled to an output of the PIR detector circuit 312 to receive the PIR voltage $V_{PIR}$. The amplifier circuit 314 may be configured to generate a detection voltage $V_{DETECT}$ that may indicate movement of the energy-emitting body through a doorway (e.g., to detect an occupant entering or exiting a room).

The occupant counting sensor 300 may comprise a control circuit 315 configured to receive the detection voltage $V_{DETECT}$ from the detection circuit 310 for detecting occupants entering and exiting the room. The control circuit 315 may comprise, for example, a microprocessor, a programmable logic device (PLD), a microcontroller, an application specific integrated circuit (ASIC), a field-programmable gate array (FPGA), or any suitable processing device. The control circuit 315 may be configured to determine an occupant count of people that have entered or exited a room based on the detection voltage $V_{DETECT}$ generated by the detector circuit 310.

Each PIR element of the PIR detector circuit 312 may be a pyroelectric element, which may produce changes in the voltages developed across the PIR element in response to changes in temperature and/or other environmental changes. The PIR elements of the PIR detector circuit 312 may be arranged in anti-series connections, such that changes in voltage across each of the PIR elements due to vibrations, changes in temperature, and/or other environmental changes will cancel each other out and not affect the magnitude of the PIR voltage $V_{PIR}$ at the output of the PIR detector circuit 312. Due to the anti-series connection of the PIR elements, the PIR detector circuit 312 may generate responses (e.g., peaks and/or pulses) of opposite polarities when each of the individual PIR elements is exposed to IR energy. This may make it possible to identify which individual PIR element detects motion (e.g., a change in infrared energy) first. This characteristic of the PIR elements of the PIR detector circuit 312 may be utilized to determine the direction of movement of an occupant in front the occupant counting sensor 300 and in turn to determine whether the occupant has entered or exited a room. For example, if the detection voltage $V_{DETECT}$ generated by the detection circuit 310 includes a first peak magnitude of positive polarity followed by a second peak magnitude of negative polarity, the control circuit 315 may determine that an occupant has passed through the doorway in a first direction (e.g., to enter the room). If the detection voltage $V_{DETECT}$ generated by the detection circuit 310 includes a first peak magnitude of negative polarity followed by a second peak magnitude of positive polarity, the control circuit 315 may determine that an occupant has passed through the doorway in a second direction (e.g., to exit the room).

Figure 3B:
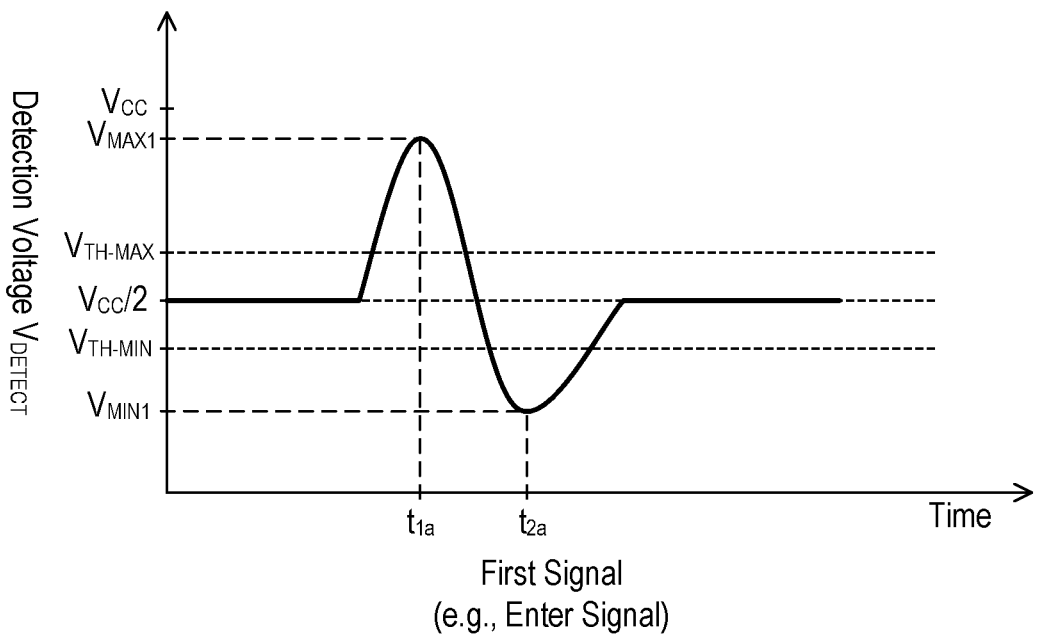
FIG. 3B shows example waveforms of the output signals of an example occupant counting sensor when a person enters and exits a space monitored by the occupant counting sensor.
Figure 3B:
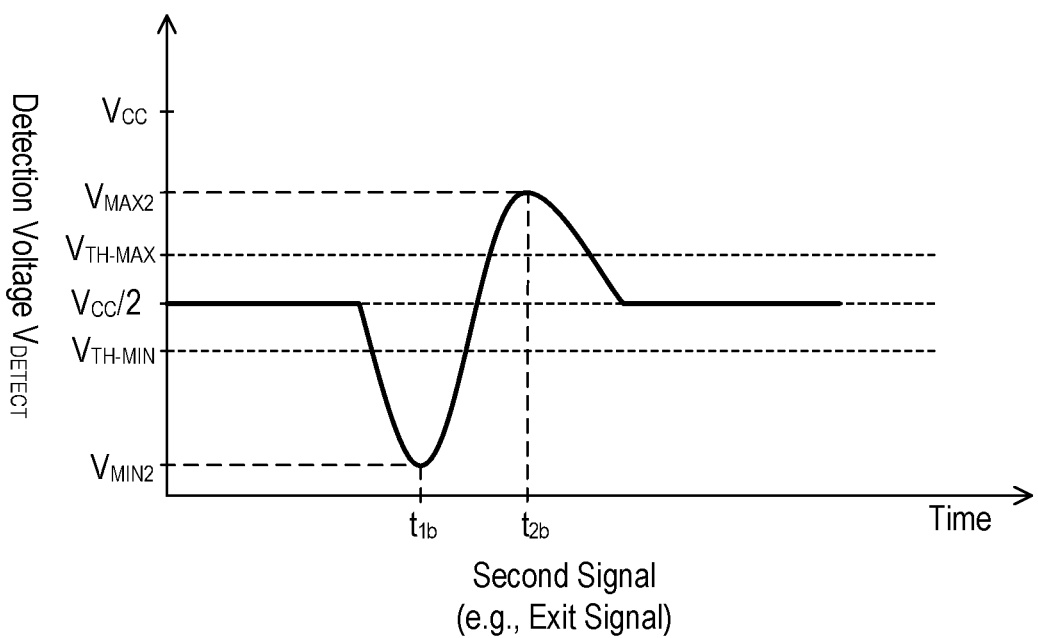

FIG. 3B shows example waveforms of the signals of the detection voltage $V_{DETECT}$ generated by the detection circuit 310. The amplifier circuit 314 may add a DC offset to the PIR voltage $V_{PIR}$, such that the detection voltage $V_{DETECT}$ is centered about a midpoint voltage, such as half of the supply voltage $V_{CC}$ (e.g., $V_{cc}/2$) as shown in FIG. 3A. The detection circuit 310 may generate a signal (e.g., an enter signal or an exit signal) when one of the PIR elements of the PIR detector circuit 312 is exposed to a change in IR energy followed by the other one of the PIR elements being exposed to a change in IR energy. For example, as an IR radiating body moves across the occupant counting sensor, a first one of the PIR elements may be exposed to changes in IR energy caused by the body movement, and then a second one of the PIR elements may be exposed to the changes in IR energy. As a result, the output of the PIR detection circuit may exhibit a specific pattern corresponding to the body movement.

As shown in FIG. 3B, a first signal (e.g., an enter signal) may be generated when an occupant enters the space monitored by the occupant counting sensor 300. Such a first signal may reach a maximum peak (e.g., positive peak) magnitude $V_{MAX1}$ at a first point in time $t_{1a}$ (e.g., when the first one of the PIR elements is exposed to IR energy), and then reach a minimum peak (e.g., negative peak) magnitude $V_{MIN1}$ at a second point in time $t_{2a}$ (e.g., when the second one of the PIR elements is exposed to the IR energy). The same characteristics of the PIR elements may cause a second signal (e.g., an exit signal) to be generated when an occupant leaves the space monitored by the occupant counting sensor. As shown in FIG. 3B, the second signal may reach a minimum peak (e.g., negative peak) magnitude at a first point in time $t_{1b}$ (e.g., when the second one of the PIR elements is exposed to IR energy), and then reach a maximum peak (e.g., positive peak) magnitude at a second point in time $t_{2b}$ (e.g., when the first one of the PIR elements is exposed to the IR energy).

The specific signals (e.g., signal pattern) that may be generated by the detector circuit 310 (e.g., the order of the maximum and minimum peaks of the signals of the detection voltage $V_{DETECT}$) that correspond to an occupant entering or exiting a room may depend on the orientation of the occupant counting sensor 300. For example, if the occupant counting sensor 300 is located adjacent to an upper right corner of the doorway inside of the room, a signal (e.g., an enter signal) having a maximum peak (e.g., positive peak) following by a minimum peak (e.g., negative peak) may indicate an occupant entering the room, while a signal (e.g., an enter signal) having a minimum peak following by a maximum peak may indicate an occupant exiting the room. If the occupant counting sensor 300 is located adjacent to an upper left corner of the doorway inside of the room, a signal (e.g., an enter signal) having a minimum peak following by a maximum peak may indicate an occupant entering the room, while a signal (e.g., an enter signal) having a minimum peak following by a maximum peak may indicate an occupant exiting the room.

The occupant counting sensor 300 may comprise an orientation switch 316 that may be responsive to an orientation actuator (e.g., the orientation actuator 206 of the occupant counting sensor 200 shown in FIG. 2). The control circuit 314 may acquire information regarding the installation orientation of the occupant counting sensor 300 via the orientation switch 316. For example, the orientation switch 316 may be set in response to an actuation of the orientation actuator during configuration of the occupant counting sensor 300. For example, the control circuit 315 may be configured to map different output signal patterns of the PIR detector circuit 310 to determinations of an occupant entering or exiting the room. As explained herein, such patterns of the signals of the detection voltage $V_{DETECT}$ may include a positive peak followed by a negative peak or a negative peak followed by a positive peak.

The control circuit 315 may maintain (e.g., determine and/or update) an occupant count for the room. In response to the detection of a motion, the control circuit 315 may take a plurality of samples of the detection voltage $V_{DETECT}$ received from the detection circuit 310 (e.g., within a sampling time period) and determine whether a mapped signal pattern can be identified. If the determination is that a mapped signal pattern has occurred, the control circuit 315 may increase or decrease the occupant count accordingly. If the occupant count is greater than zero, the control circuit 315 may additionally infer that the room is occupied. When the occupant count falls to zero, the control circuit 315 may additionally infer that the room has become unoccupied.

The control circuit 315 may be configured to store the occupant count and/or occupancy status in a memory 318 of the occupant counting sensor 300. The memory 318 may be implemented as an external integrated circuit (IC) coupled to the control circuit 315 or as an internal circuit of the control circuit 315. The control circuit 315 may be configured to save different occupant counts that are associated with different time periods in the memory 318 so that a historical view of the occupancy condition of the room (e.g., a usage history) may be derived.

The occupant counting sensor 300 may comprise a communication circuit 320 configured to transmit and/or receive digital messages via a communication link using a communication protocol. For example, the communication link may comprise a wireless communication link and the communication circuit 320 may comprise an RF transceiver coupled to an antenna. The communication link may comprise a wired digital communication link and the communication circuit 320 may comprise a wired communication circuit. The communication protocol may comprise a proprietary protocol, such as, for example, the ClearConnect protocol. The control circuit 315 may be configured to transmit and/or receive digital messages via the communication link during normal operation of the occupant counting sensor 300. For example, the control circuit 315 may be configured to transmit an indication of a determined occupant count (or a change thereof) of the room to a system controller (e.g., the system controller 110 of FIG. 1). The control circuit 315 may also be able to receive an indication of an occupant count (or a change thereof) of the room determined by another occupant counting sensor (e.g., an occupant counting sensor installed at a different doorway of the room). In the latter case, the occupant counting sensor 300 may perform some or all of the functions of a system controller, as described herein.

The occupant counting sensor 300 may comprise a power source 322 for producing a DC supply voltage $V_{CC}$ for powering the control circuit 315, the memory 318, the communication circuit 320 and other low-voltage circuitry of the occupant counting sensor 300. The power source 322 may comprise a power supply configured to receive an external supply voltage from an external power source (e.g., an AC mains line voltage power source and/or an external DC power supply). In addition, the power source 322 may comprise a battery for powering the circuitry of the occupant counting sensor 300.

Figure 4:
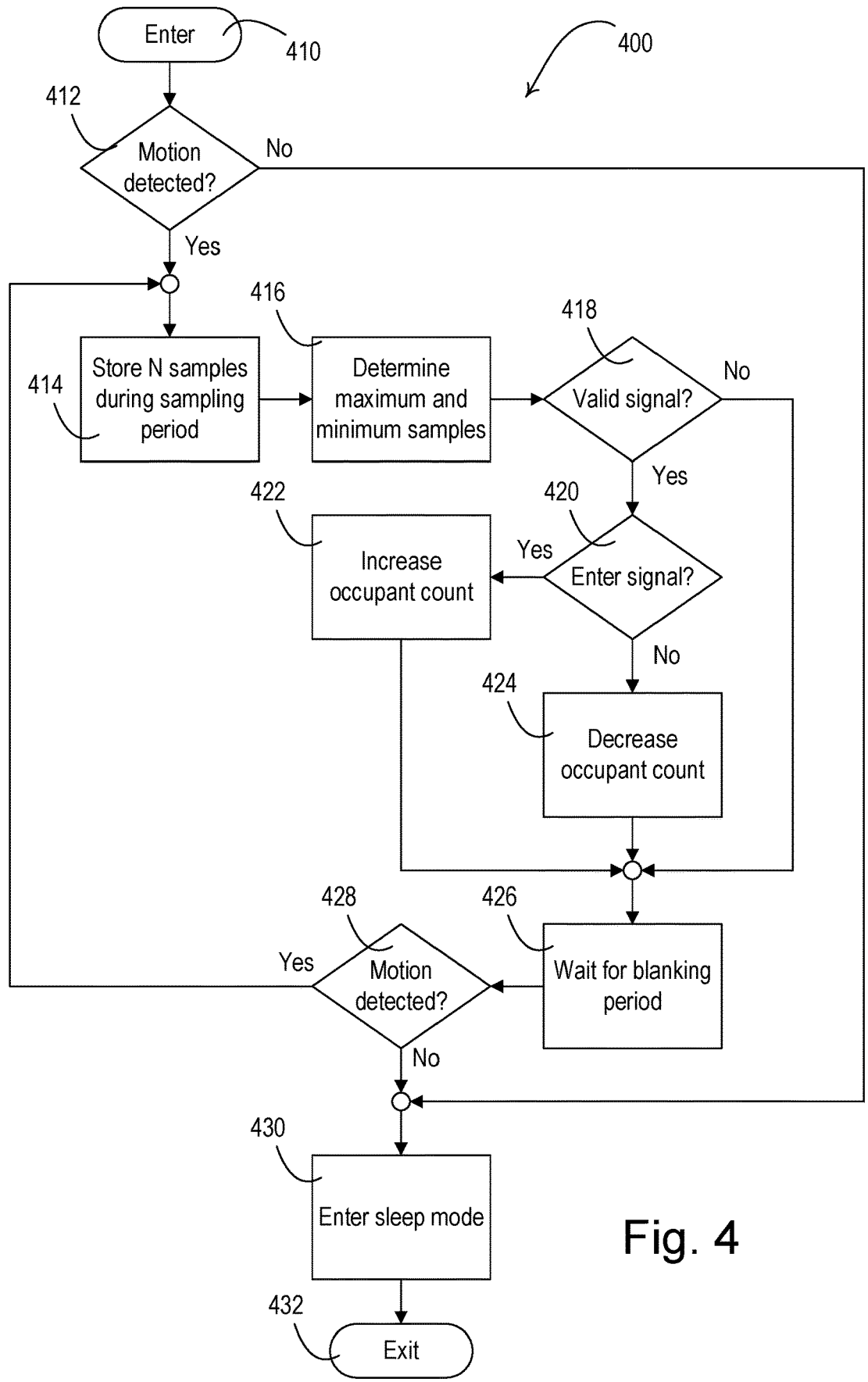
FIG. 4 is a flowchart of an example occupant counting procedure.

FIG. 4 is a simplified flowchart of an example occupant counting procedure 400. The occupant counting procedure 400 may be executed (e.g., periodically) by a control circuit of an occupant counting sensor (e.g., the control circuit 315 of the occupant counting sensor 300) at 410. At 412, the control circuit may determine, e.g., based on a detection signal generated by a detection circuit (e.g., the detection circuit 310) if motion has been detected in the proximity of the occupant counting sensor (e.g., if either of the PIR elements has detected a change in IR energy). For example, the control circuit may compare the magnitude of the detection signal to a motion threshold to determine if motion has been detected at 412. If a motion has been detected at 412 (e.g., the magnitude of the detection signal is greater than the motion threshold), the control circuit may, at 414, start to sample the output of the detection circuit for a period of time and/or until a number of samples (e.g., N samples of output voltage) have been collected/stored. The duration of this sampling period and/or the number of samples to be collected may be preconfigured and stored in a memory of the occupant counting sensor.

At 416, the control circuit may determine (e.g., identify) the maximum magnitude (e.g., a peak voltage with positive polarity) and minimum magnitude (e.g., a peak voltage with negative polarity) of the collected samples. Based on the maximum and minimum magnitudes of the sample signals, the control circuit may determine, at 418, whether the collected samples represent a valid signal generated in response to an occupant entering or exiting a space monitored by the occupant counting sensor. The control circuit may make this determination by checking whether the maximum and minimum magnitudes of the samples are of opposite polarities and/or whether the respective absolute values of the maximum and minimum magnitudes exceed respective maximum and minimum thresholds (e.g., preconfigured thresholds $V_{TH-MAX}$ and $V_{TH-MIN}$ as shown in FIG. 3B). The absolute values of the thresholds $V_{TH-MAX}$ and $V_{TH-MIN}$ may be the same or may be different from each other. A continuous output signal such as that generated in response to an occupant stopped in the doorway and/or a continuous stream of people coming through a doorway on which the sensor is installed (e.g., a congo line) may not demonstrate the aforementioned pattern and therefore may not produce a response from the control circuit.

If the control circuit determines that the collected samples represent a valid signal associated with an occupant entering or exiting the space (e.g., the maximum and minimum magnitudes of the samples are of opposite polarities (e.g., bipolar) and the absolute values of the maximum and minimum magnitudes exceed those of the respective thresholds), the control circuit may further determine, at 420, whether the pattern reflected in the collected samples corresponds to an occupant entering the space or exiting the space. As described herein, the respective patterns associated with an occupant entering the space and exiting the space may be determined based on the installation orientation of the occupant counting sensor, which may be indicated to the control circuit via a switching device (e.g., the orientation switch 206). Also as described herein, the patterns associated with an occupant entering the space and exiting may include a peak positive voltage followed by a peak negative voltage, a peak negative voltage followed by a peak positive voltage, and/or vice versa.

If the pattern of the collected samples indicates that an occupant has entered the space, the control circuit may increase an occupant count (e.g., a sensor occupant count) by one at 422. Otherwise, the control circuit may decrease the occupant count by one at 424. After adjusting the occupant count, the control circuit may wait for a blanking period (e.g., with a configurable duration) at 426 before checking again, at 428, whether another motion in the proximity of the occupant counting sensor has been detected. The blanking period may prevent the control circuit from responding to any residual peaks of the signal generated by the detection circuit as a result of the occupant entering or exiting the room. If there is motion at 428, the control circuit may repeat the actions described above. If there is no motion at 428, the control circuit may, at 430, enter a sleep mode for a preconfigured period of time or until the control circuit is notified about the detection of a motion in its proximity. The control circuit may then exit the procedure 400 at 432.

The control circuit may also enter the sleep mode at 430 when the control circuit determines that no motion has been detected at 412.

Figure 5:
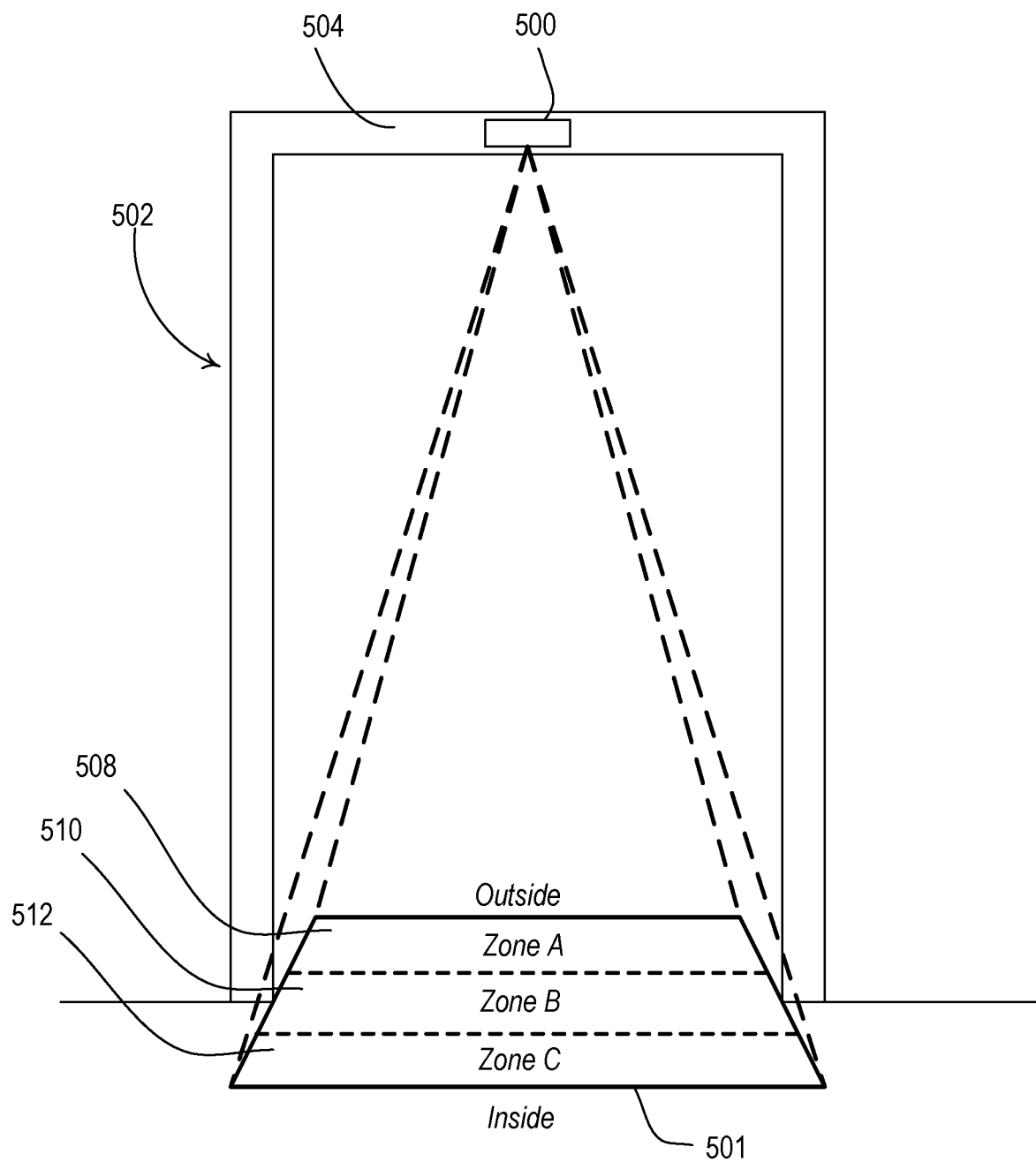
FIG. 5 is an example diagram illustrating an occupant counting sensor configured to detect an occupant in a space based on movements of the occupant in a two-dimensional area.

FIG. 5 shows an example occupant counting sensor 500 (e.g., the occupant counting sensor 190 of FIG. 1) configured to detect an occupant (e.g., a person and/or an energy-emitting body) entering or exiting a space (e.g., a room). The occupant counting sensor 500 may be installed near a doorway 502 of the space, thus having a field of view of the doorway 502. For example, the occupant counting sensor 500 may be placed near an upper side of the doorway 502 (e.g., an upper center section of the doorway), an upper or a lower corner of the doorway 502, to a middle side section of the doorway 502, to the left side or the right side of the doorway 502, and/or to the inside or outside of the doorway 502. The occupant counting sensor 500 may be mounted to a door frame 504 around the doorway 502, inside of the door frame 504, and/or otherwise mounted to the structure surrounding the door frame 504 to appropriately detecting an occupant moving through the doorway 502. In addition, although only one occupant counting sensor is shown in FIG. 5, multiple such sensors may be mounted to various locations near the doorway 502 to improve the accuracy of the detection of people entering or exiting the space.

The occupant counting sensor 500 may include a detection circuit (not shown) configured to detect one or more occupants (e.g., energy-emitting bodies) in a coverage area (e.g., an area near the doorway 502), and generate one or more signals indicating a location of one or occupant(s) in the coverage area. The detection circuit may be configured to generate an occupant map, e.g., a two-dimensional (2D) map or image indicating the locations of the occupants. The occupant map may also comprise a three-dimensional (3D) map or image. For example, the detection circuit may comprise a thermopile array such as an N×N array of heat-responsive elements. The detection circuit may comprise a microbolometer array (e.g., an N×N array of heat-responsive elements) or another suitable type of thermal camera or detector. The heat-responsive elements may be sensitive to thermal energy levels at various spots of the coverage area 501, and may operate to covert the thermal energy into electrical signals indicative of the thermal energy levels in the coverage area. As such, the output of the thermopile array may represent an occupant map (e.g., a 2D thermal image or heat map) of the coverage area 501 with each heat-responsive element of the thermopile array corresponding to a pixel in the heat map. As a heat-emitting object (e.g., a person or occupant) moves in and out of the coverage area 501 and/or through the coverage area 501, the output of the thermopile array (e.g., the 2D thermal image) may indicate changes (or lack of changes) in the thermal energy levels at the various spots of the coverage area. The output may consequently be used to determine the location of the heat-emitting object in the coverage area 501. The detection circuit may also comprise a radar sensing circuit, a visible light sensing circuit (e.g., a camera), and/or a time-of-flight sensing circuit (e.g., as will be described in greater detail below).

The occupant counting sensor 500 may further include a control circuit (not shown) coupled to the detection circuit (e.g., thermopile array) and configured to receive the output signals (e.g., the occupant map) of the detection circuit. The control circuit may comprise, for example, a microprocessor, a programmable logic device (PLD), a microcontroller, an application specific integrated circuit (ASIC), a field-programmable gate array (FPGA), or any suitable processing device. The control circuit may be configured to process the output signals (e.g., the occupant map) of the detection circuit and determine the location and/or movements of a person in the coverage area 501 based on the processed output signals. For example, the occupant map may be used to monitor the coverage area 501 near the doorway 502. The coverage area 501 may comprise a plurality of zones. A first zone (e.g., zone A 508 shown in FIG. 5) may correspond to an area outside of the doorway 502 (e.g., outside of the space or room), a second zone (e.g., zone B 510 shown in FIG. 5) may correspond to all or a part of the doorway 502, and a third zone (e.g., zone C 512 shown in FIG. 5) may correspond to an area inside of the doorway 502 (e.g., inside the space or room). The control circuit may, in response to receiving the output signals (e.g., the occupant map) from the detection circuit, detect the location and/or movements of the person relative to the plurality of zones 508-512 and determine whether the person has entered or exited the space based on the detected location and/or movements of the person. For instance, if the control circuit determines, based on the output signals (e.g., the occupant map) of the detection circuit, that the person has moved through the plurality of zones in a first order (e.g., from zone A 508 to zone C 512 through zone B 510), the control circuit may further determine that the person has entered the space. Likewise, if the control circuit determines, based on the output signals (e.g., the occupant map) of the detection circuit, that the person has moved through the plurality of zones in a second order (e.g., from zone C 512 to zone A 508 through zone B 510), the control circuit may further determine that the person has left the space.

The control circuit may determine an occupant count of the space in response to determining that a person has entered or exited the space. For example, the control circuit may increase an occupant count of the space based on a determination that a person has entered the space, and may decrease the occupant count based on a determination that a person has left the space.

The occupant counting sensor 500 may be configured to transmit one or more digital messages to a system controller (e.g., the system controller 110) via RF signals (e.g., using the proprietary protocol described herein) in response to determining an occupant count of the space. The digital messages may indicate the occupant count or a change thereof. For example, the occupant counting sensor 500 may be a one-way transmitter (e.g., may not be configured to receive digital messages), and may be configured to periodically transmit a sensor occupant count that indicates the changes in the number of occupants since the last transmission from the occupant counting sensor 500. The occupant counting sensor 500 may be configured to reset the occupant count stored in memory at the occupant counting sensor after the occupant counting sensor transmits the change in occupant count. For example, the sensor occupant count may be either positive or negative based on how many occupants enter or exit the space since the last reset of the occupant count. The system controller may be configured to maintain a central occupant count for the space. For example, the system controller may add the sensor occupant count (e.g., that indicates the changes in the occupant count of the space) to the central occupant count in response to receiving the sensor occupant count from the occupant counting sensor 500.

The occupant counting sensor 500 may comprise a switch (not shown) that may be manipulated to inform the occupant counting sensor 500 about the orientation and/or location of the installation (e.g., whether the occupant counting sensor is mounted to center of the doorway 502, on the left or right side of the doorway 502, and/or inside or outside of the doorway 502). Based on the orientation, the occupant counting sensor 500 may know which specific output signal corresponds to which direction of movement. For example, when the occupant counting sensor 500 is installed with a first orientation, the sensor may associate a first output signal pattern with a person entering through the doorway 502. When the occupant counting sensor 500 is installed with a second orientation, the sensor may associate a second output signal pattern with a person leaving through the doorway 502.

Figure 6:
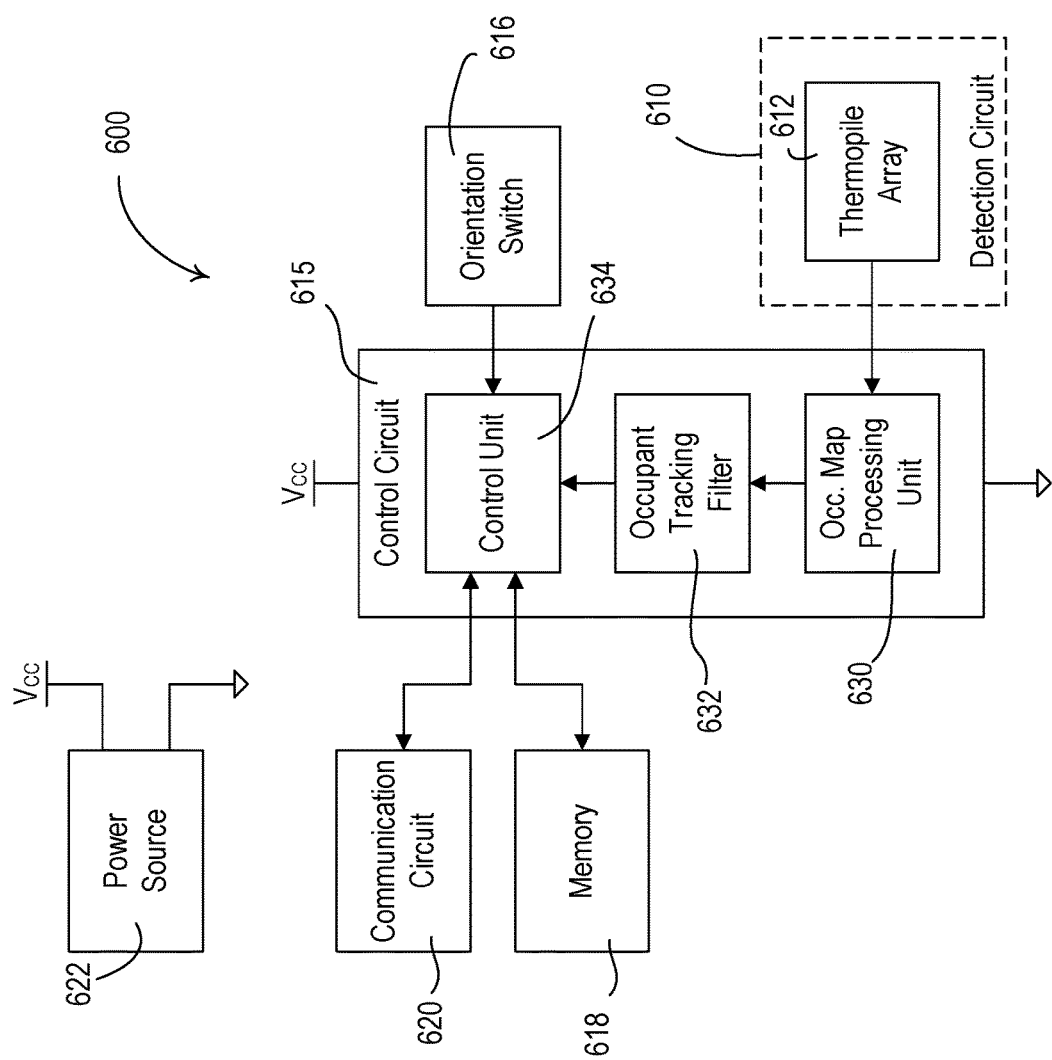
FIG. 6 is a block diagram of an example occupant counting sensor as described in FIG. 5.

FIG. 6 is an example block diagram of an example occupant counting sensor 600 (e.g., the occupant counting sensor 500 of FIG. 5). The occupant counting sensor 600 may comprise a detection circuit 610 and a control circuit 615. The detection circuit 610 may be configured to generate an occupant map, e.g., a two-dimensional (2D) map or image indicating the locations of the occupants. The occupant map may also comprise a three-dimensional (3D) map or image. For example, the detection circuit 610 may comprise a thermopile array 612 (e.g., N×N heat-responsive elements, where N may be equal to 8). These heat-responsive elements may be capable of detecting thermal energy (e.g., heat) generated from an energy-emitting body (e.g., an occupant) in a coverage area (e.g., the coverage area 501 shown in FIG. 5) and producing one or more signals that represent an occupant map (e.g., a 2D thermal image or heat map) of the area. Each heat-responsive element may correspond to a pixel in the occupant map (e.g., the 2D thermal image) and the signal generated by the heat-responsive element may represent the thermal energy level at a respective spot of the coverage area. As such, the output of the detection circuit 610 may be used to determine where the occupant (e.g., the energy-emitting body) is in the coverage area (e.g., since the thermal energy level at the location of the energy-emitting body may be different than the thermal energy levels at other locations of the coverage area).

The control circuit 615 may be configured to receive the signals generated by the detection circuit 610 and determine the X-Y coordinates of the occupant (e.g., the energy-emitting body) in the occupant map (e.g., the 2D thermal image) or the area covered by the detection circuit 610. The control circuit 615 may comprise a occupant map processing unit 630 (e.g., a software module for processing the occupant map), an occupant tracking filter 632 (e.g., a software module implementing a Kalman tracking filter), and/or a control unit 634 (e.g., a control software module). The control circuit 615 may comprise a microprocessor, a programmable logic device (PLD), a microcontroller, an application specific integrated circuit (ASIC), a field-programmable gate array (FPGA), or any suitable processing device that may be configured to perform the functions of the occupant map processing unit 630, the occupant tracking filter 632, and/or the control unit 634. Although shown as comprising all three of the occupant map processing unit 630, the occupant tracking filter 632, and/or the control unit 634, the control circuit may also comprise a subset of those components.

The occupant map processing unit 630 may be configured to receive inputs from the detection circuit 610 and output preliminary coordinates of an occupant in the occupant map or the area covered by the occupant counting sensor 600. The inputs received from the detection circuit 610 may represent, for example, a plurality of pixels of the occupant map (e.g., the 2D thermal image) for the covered area and the occupant map processing unit 630 may identify which one or more pixels of the occupant map represent (e.g., are covered by) the occupant (e.g., the energy-emitting body). For example, the identification may be made by comparing the thermal energy level at each pixel of the 2D thermal image generated by the detection circuit 610 to a pre-determined threshold value and determining that a pixel is covered by the energy-emitting body if the thermal energy level at the pixel exceeds the pre-determined threshold.

Upon identifying the one or more pixels of the occupant map representing the occupant, the occupant map processing unit 630 may further determine the X-Y coordinates of the occupant. For example, if the occupant occupies just one of the pixels of the occupant map, the occupant map processing unit 630 may determine the X-Y coordinates of the occupant based on the location of that one pixel in the occupant map. If the energy-emitting body occupies multiple of the pixels of the occupant map, the occupant map processing unit 630 may determine the X-Y coordinates of the occupant based on a centroid of the multiple pixels (e.g., based on a center pixel among the multiple pixels).

The X-Y coordinates determined by the occupant map processing unit 630 may deviate from the actual coordinates of the occupant in the occupant map or the coverage area covered by the detection circuit 610 (e.g., due to errors introduced when measuring the thermal energy levels). Such deviations may be reduced or eliminated by further processing the X-Y coordinates determined by the occupant map processing unit 630 using a filter (e.g., the occupant tracking filter 632) and obtaining refined X-Y coordinates of the occupant at the output of the filter.

The X-Y coordinates (e.g., refined X-Y coordinates) of the occupant may be provided to the control unit 634 and used to determine the movements of the occupant in an area covered by the detection circuit 610. As described herein, the coverage area of the detection circuit 610 may comprise a plurality of zones (e.g., zones 508-512 shown in FIG. 5). The zones may correspond, for example, to areas near an entrance or exit of a space. As such, by tracking the movements of the occupant in these areas, the control unit 634 may determine whether the occupant has entered or exited the space. For example, the control unit 634 may use a state machine to track an occupant moving through the zones of the coverage area. The control unit 634 may be configured to track multiple occupants within the coverage area. For example, the control unit 634 may use separate state machines for each of the multiple occupants in the coverage area.

When tracking an occupant entering the space, the control unit 634 may initially determine, based on the X-Y coordinates of the occupant, that the occupant has entered a first zone near (e.g., just outside) an entrance or exit of the space (e.g., zone A 508 shown in FIG. 5). In response to detecting the occupant in this zone, the control unit 634 may assign an identifier (e.g., a tracking number) to the occupant. Subsequently, the control unit 634 may determine, based on updated X-Y coordinates of the occupant provided by the detection circuit 610 and the identifier assigned to the occupant, that the occupant has moved from the first zone through a second zone (e.g., zone B 510 shown in FIG. 5) into a third zone (e.g., zone C 510 shown in FIG. 5) inside the entrance or exit of the space. In response to detecting that the occupant entered the first zone, moved through the zones, and exited the last zone, the control unit 634 may determine that the occupant has entered the space.

Similarly, after initially detecting the occupant, the control unit 634 may later determine, based on X-Y coordinates of the occupant and the identifier assigned to the occupant, that the occupant has moved from the third zone through the second zone into the first zone. In that case, the control unit 634 may determine that the occupant has left the space and may disassociate the occupant with the identifier assigned to the occupant.

In certain situations, the control unit 634 may lose track of an occupant or determine that a tracked occupant has shown a lack of movements (e.g., no movements for a preconfigured time duration). In response, the control unit 634 may mark the occupant as an idle occupant (e.g., being in an idle state), and may disassociate the occupant with the identifier previously assigned to the occupant. Subsequently, if the control unit 634 detects the occupant again (e.g., when the occupant enters zone A, zone B or zone C) or if the control unit 634 determines that the occupant has resumed movements, the control unit 634 may assign a new identifier to the occupant and start tracking the occupant again.

The occupant counting sensor 600 may more accurately detect when the occupant enters or leaves the space by tracking the movements of an occupant through multiple zones of a two-dimensional area and determining whether the occupant has entered or exited the space based on the tracked movements. Using these techniques, the occupant counting sensor 600 may avoid false determinations of an occupant's entry or exit status with respect to a particular space. For example, if an occupant lingers in a doorway of the space (e.g., if the occupant enters zone B shown in FIG. 5 but does not leave), the control unit 634 may not make a determination regarding the occupant's entry or exit status until further movements of the occupant are detected (e.g., until the occupant moves into zone A or zone C shown in FIG. 5).

The control unit 634 may maintain an occupant count for the space that the control unit is configured to monitor. If the control unit 634 determines that an occupant has entered the space, the control circuit 634 may increase the occupant count accordingly. If the control unit 634 determines that an occupant has left the space, the control circuit 634 may decrease the occupant count accordingly. If the occupant count is greater than zero, the control unit 614 may additionally infer that the space is occupied. When the occupant count falls to zero, the control unit 634 may infer that the space has become unoccupied.

The occupant counting sensor 600 may comprise an orientation switch 616. The orientation switch 616 may be manipulated to inform the occupant counting sensor 600 about the orientation of the installation (e.g., whether the occupant counting sensor is mounted to the center of the doorway 502, on the left or right side of the doorway 502, and/or inside or outside of the doorway 502). Based on the orientation, the occupant counting sensor 600 may know how to interpret the signals (e.g., the 2D thermal image) received from the detection circuit 610 in order to determine the location (e.g., X-Y coordinates) and/or movements of an occupant.

The occupant counting sensor 600 may comprise a memory 618 configured to store the X-Y coordinates of the occupants as provided by the occupant map processing unit 630 and/or the occupant tracking filter 632. The memory 618 may also be configured to store information (e.g., boundary information) about one or more zones of a coverage area, as described herein. The memory 618 may also be configured to store the identifier (e.g., the tracking number) of the occupant as well as the state of the state machine (e.g., which zone(s) of the coverage area the occupants are in) and/or the X-Y coordinates associated with the tracking number. The stored information may be used by the control unit 634 to track the movements of the occupants and/or to determine the entry/exit status of the occupants, as described herein. When an occupant exits the coverage area, the tracking number and associated state machine state (e.g., X-Y coordinates) may be deleted from the memory 618. The memory 618 may also be configured to store the occupant count and/or occupancy status of the space. For example, the control unit 634 may be configured to save different occupant counts that are associated with different time periods in the memory 618 so that a historical view of the occupancy condition of the space (e.g., a usage history) may be derived. Further, operational parameters of the occupant counting sensor 600 may also be stored in the memory 618. For example, the control unit 634 may be configured to store the threshold value for determining whether a pixel in the occupant map corresponds to an occupant in the memory 618. The memory 618 may be implemented as an external integrated circuit (IC) coupled to the control circuit 615 or as an internal circuit of the control circuit 615.

The occupant counting sensor 600 may comprise a communication circuit 620 configured to transmit and/or receive digital messages via a communication link using a communication protocol. For example, the communication link may comprise a wireless communication link and the communication circuit 620 may comprise an RF transceiver coupled to an antenna. The communication link may comprise a wired digital communication link and the communication circuit 620 may comprise a wired communication circuit. The communication protocol may comprise a proprietary protocol, such as, for example, the ClearConnect protocol. The control circuit 615 may be configured to transmit and/or receive digital messages via the communication link during normal operation of the occupant counting sensor 600. For example, the control circuit 615 may be configured to transmit an indication of a determined occupant count (or a change thereof) of a space to a system controller (e.g., the system controller 110 of FIG. 1) using the communication circuit 620. The control circuit 615 may also be able to receive an indication of an occupant count (or a change thereof) of a space determined by another occupant counting sensor (e.g., an occupant counting sensor installed at a different doorway of the space). In the latter case, the occupant counting sensor 600 may perform some or all of the functions of a system controller, as described herein.

The occupant counting sensor 600 may comprise a power source 622 for producing a DC supply voltage $V_{CC}$ for powering the detection circuit 610, control circuit 615, the memory 618, the communication circuit 620 and other low-voltage circuitry of the occupant counting sensor 600. The power source 622 may comprise a power supply configured to receive an external supply voltage from an external power source (e.g., an AC mains line voltage power source and/or an external DC power supply). In addition, the power source 622 may comprise a battery for powering the circuitry of the occupant counting sensor 600.

The detection circuit 610 may also comprise a radar sensing circuit, a visible light sensing circuit, and/or a time-of-flight sensing circuit. For example, when the detection circuit 610 comprises a radar sensing circuit, the occupant map processing unit 630 of the control circuit 615 may comprise a radar detection software module. The radar sensing circuit may comprise a transmitting antenna array (e.g., a phased array) coupled to the control circuit 615 (e.g., the radar detection software module) via a radar transmitter circuit, and/or a receiving antenna array (e.g., a phased array) coupled to the control circuit 615 (e.g., the radar detection software module) via a radar receiver circuit. In addition, when the detection circuit 610 comprises a visible light sensing circuit, the occupant map processing unit 620 of the control circuit 615 may comprise an image processing software module. The visible light sensing circuit may comprise a camera configured to record an image of the space that may be received by the image processing software module of the control circuit 615.

Figure 7A:
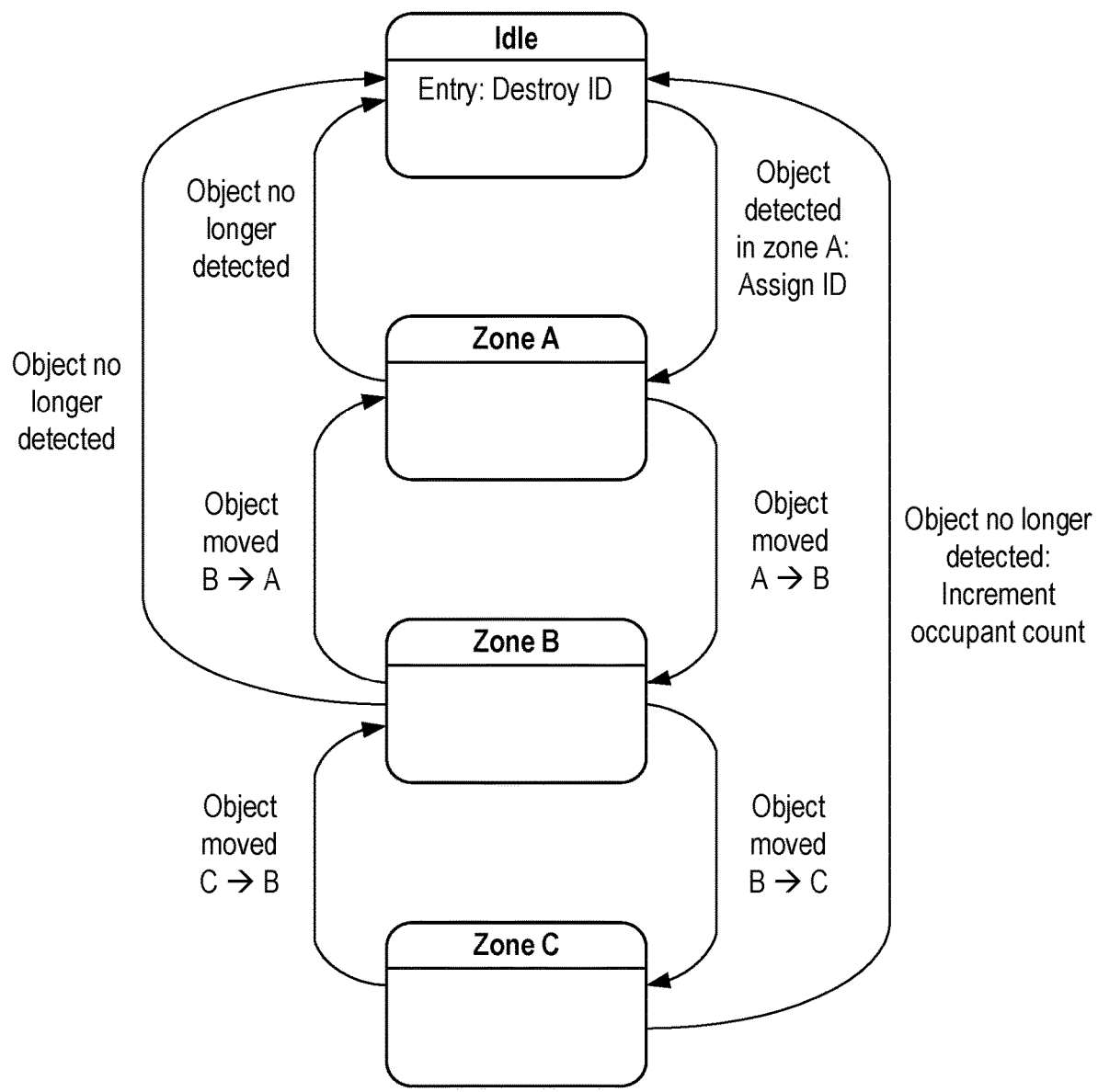
FIG. 7A is an example state diagram for determining the movements of an occupant when the occupant is entering a space.

FIG. 7A is an example state diagram that may be used by an occupant counting sensor (e.g., the occupant counting sensor 500 of FIG. 5, and/or the occupant counting sensor 600 of FIG. 6) for determining the movements of an occupant (e.g., an energy-emitting body) when the occupant is entering a space (e.g., a room). The occupant counting sensor may use a separate state machine to track each occupant in the coverage area. The occupant counting sensor may be in an idle state before detecting an occupant that may be entering the space (e.g., when there are no occupants in the coverage area). The occupant may enter a first zone (e.g., Zone A) of an area monitored by the occupant counting sensor. Such entry may be detected by the occupant counting sensor (e.g., as described herein) and the occupant counting sensor may assign an identifier (e.g., a tracking number) to the detected occupant. The occupant counting sensor may save the identifier, the state of the state machine (e.g., the zone of the coverage area that the occupant is in), and/or the location (e.g., X-Y coordinates) of the occupant in a memory (e.g., the memory 618) of the occupant counting sensor. As the occupant moves from the first zone to a second zone (e.g., Zone B), the occupant counting sensor may track (e.g., record) that movement (e.g., using the occupant tracking filter 632), for example, based on updated coordinates of the occupant and/or the identifier assigned to the occupant. The occupant counting sensor may similarly track the movement of the occupant as the occupant moves from the second zone to a third zone (e.g., Zone C). When the occupant exits the third zone, the occupant detection sensor may no longer detect the occupant in the coverage area. In response to detecting the movement of the occupant through the first, second and third zones (e.g., in that specific order) and then exiting the third zone, the occupant counting sensor may determine that the occupant has entered the space. As a result, the occupant counting sensor may increase an occupant count of the space to reflect that the occupant has entered the space. The occupant counting sensor may then disassociate the occupant with the identifier previously assigned to the occupant (e.g., the occupant counting sensor may destroy the identifier assigned to the occupant) and eliminate that instance of the state machine. The occupant counting sensor may then re-enter the idle state.

When in any of the first, second, or third zone, the occupant may become static (e.g., exhibits a lack of movements and/or is lingering in the doorway) or undetectable (e.g., the occupant has exited the coverage area monitored by the occupant counting sensor). In those situations, the occupant counting sensor may consider the occupant to have entered an idle or stationary state, and as a result, the occupant counting sensor may disassociate the occupant with the identifier previously assigned to the occupant (e.g., the occupant counting sensor may destroy the identifier assigned to the occupant), and eliminate the instance of the state machine. In addition, the occupant counting sensor may determine that the occupant has moved backwards, for example, from the third zone to the second zone, or from the second zone to the first zone.

Figure 7B:
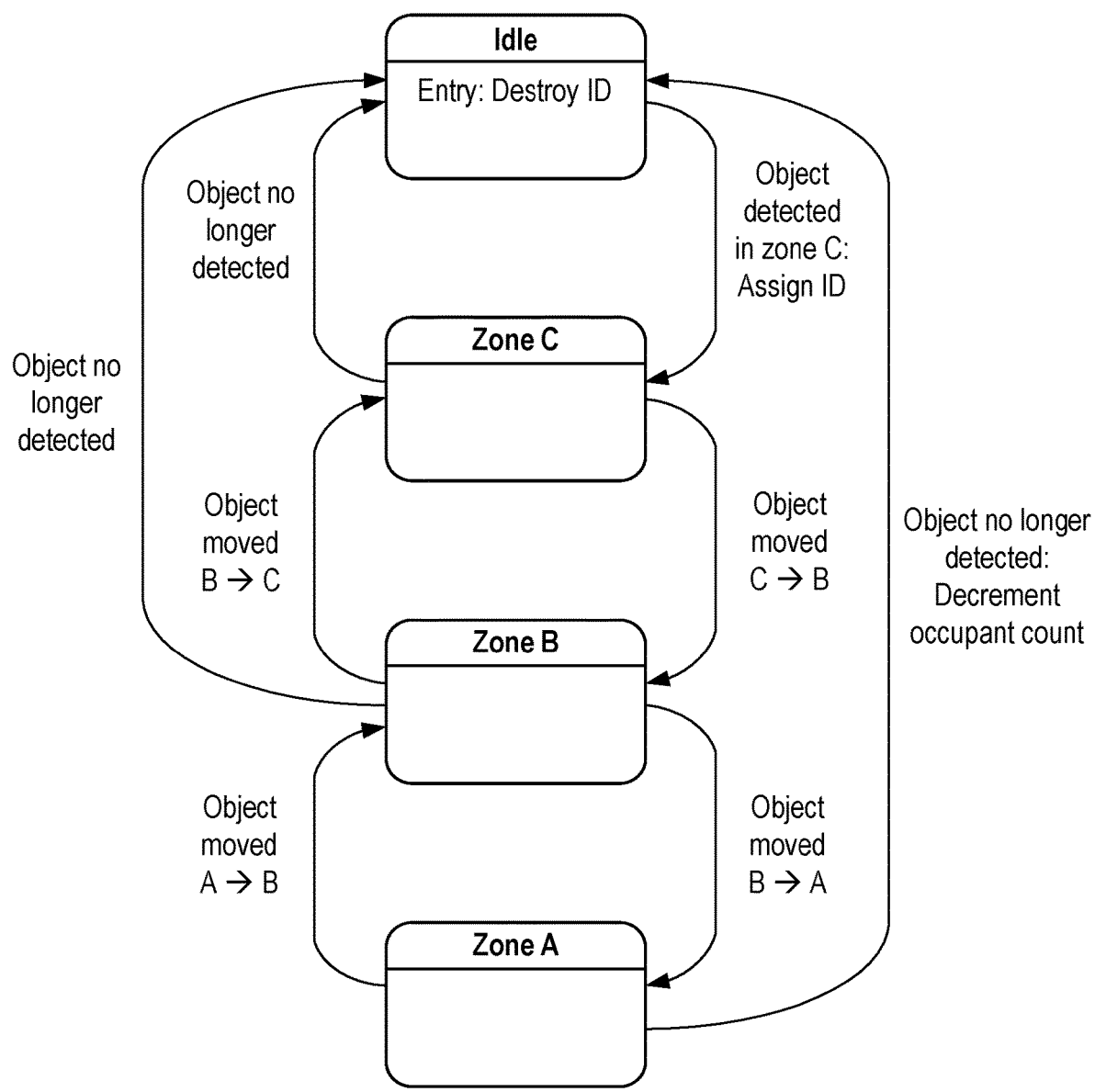
FIG. 7B is an example state diagram for determining the movements of an occupant when the occupant is leaving a space.

FIG. 7B is an example state diagram that may be used by an occupant counting sensor (e.g., the occupant counting sensor 500 of FIG. 5, and/or the occupant counting sensor 600 of FIG. 6) for determining the movements of an occupant when the occupant is exiting a space (e.g., a room). The occupant counting sensor may use a separate state machine to track each occupant in the coverage area. As described above, the occupant counting sensor may be in the idle state before being detecting an occupant that may be entering the space. The occupant may be detected by the occupant counting sensor in the third zone (e.g., Zone C). In response to the detection, the occupant counting sensor may assign an identifier to the occupant. The occupant counting sensor may save the identifier, the state of the state machine (e.g., the zone of the coverage area), and/or the location (e.g., X-Y coordinates) of the occupant in a memory (e.g., the memory 618) of the occupant counting sensor. As the occupant moves from the third zone to the second zone (e.g., Zone B), the occupant counting sensor may track (e.g., record) that movement (e.g., using the occupant tracking filter 632), for example, based on updated coordinates of the occupant and/or the identifier assigned to the occupant. The occupant counting sensor may similarly track the movement of the occupant as the occupant moves from the second zone to the first zone (e.g., Zone A). When the occupant exits the first zone, the occupant detection sensor may no longer detect the occupant in the coverage area. In response to detecting the movement of the occupant through the third, second and first zones (e.g., in that specific order) and then exiting the first zone, the occupant counting sensor may determine that the occupant has left the space. As a result, the occupant counting sensor may decrement the occupant count maintained for the space. The occupant counting sensor may then disassociate the occupant with the identifier previously assigned to the occupant (e.g., the occupant counting sensor may destroy the identifier assigned to the occupant), and eliminate that instance of the state machine. The occupant counting sensor may then re-enter the idle state.

When in any of the first, second, or third zone, the occupant may become static (e.g., exhibits a lack of movements and/or is lingering in the doorway) or undetectable (e.g., the occupant has exited the coverage area monitored by the occupant counting sensor). In that situation, the occupant counting sensor may consider the occupant to have entered an idle or stationary state, and as a result, the occupant counting sensor may destroy the identifier assigned to the occupant and eliminate the instance of the state machine. In addition, the occupant counting sensor may determine that the occupant has moved backwards, for example, from the first zone to the second zone, or from the second zone to the third zone.

Although described herein as comprising a thermopile array, an occupant counting sensor (e.g., the occupant counting sensor 500 or the occupant counting sensor 600) may alternatively or additionally comprise a radar sensing circuit. Such a radar sensing circuit may in turn comprise a radar detection processor, a transmitting antenna array (e.g., a phased array) coupled to the radar detection processor (e.g., via a radar transmitter circuit), and/or a receiving antenna array (e.g., a phased array) coupled to the radar detection processor (e.g., via a radar receiver circuit). The radar sensing circuit may be implemented using modulated continuous wave radar technology or other types of radar technology, such as, for example, pulsed radar, continuous wave radar, side aperture radar, phased-array radar, monostatic radar, multi-static radar, and/or the like. The radar detection processor may be configured to transmit a radar signal (e.g., a chirp) via a transmitting antenna array, and receive a reflected signal via a receiving antenna array. The radar signal may be a frequency-modulated continuous waveform (FMCW) that increased in frequency over a period time. The radar sensing circuit may be configured to process the reflected signal (e.g., as compared to the transmitted radar signal) to determine a Doppler shift of the reflected signal and data regarding an occupant of the space, such as the distance to the occupant, a direction of movement of the occupant, and/or an acceleration of the occupant.

The radar detection processor may be configured to measure the angles at which a moving object (e.g., an occupant) may be detected using the transmitting antenna array and the receiving antenna array. The radar detection processor may be configured to measure various detection angles and determine data regarding the moving object at each detection angle. The radar detection processor may transmit a radar signal at each detection angle and receive a reflected signal to process. The radar detection processor may be configured to build a map (e.g., a two-dimensional or three-dimensional map) of the moving object in an area monitored by the radar sensing circuit based on the determined data regarding the moving object at each detection angle. The map may be built in a similar manner as the heat map or 2D thermal image described in association with a thermopile array, at least with respect to how the map may be used to determine a location (e.g., X-Y coordinates) of the moving object in the map or the area covered by the map. Such a map may be used to determine the entry/exit status of the moving object and/or the number of occupants in the monitored area. Therefore, the techniques described above regarding tracking the moving object through multiple zones in order to determine the entry, exit or idle status of the moving object (e.g., as depicted in FIGS. 7A and 7B) may be equally applicable to an occupant counting sensor comprising a radar sensing circuit. For example, when the occupant counting sensor comprises a radar sensing circuit, the occupant tracking filter may be implemented as an extended Kalman tracking filter.

The occupant counting sensor described herein (e.g., the occupant counting sensor 500 or the occupant counting sensor 600) may comprise a visible light sensing device that utilizes a camera directed to an area of interest of the space to record images of the area. These images may contain information regarding one or more characteristics of the area such as the movements of an object in the area. The images may be processed (e.g., similarly to the heat map of 2D thermal image described above) to determine an occupancy condition and/or occupant count of the area. Therefore, the techniques described above regarding tracking the moving object through multiple zones in order to determine the entry, exit or idle status of the moving object (e.g., as depicted in FIGS. 7A and 7B) may be equally applicable to an occupant counting sensor comprising a visible light sensing device. Examples of a visible light sensing device are described in greater detail in commonly-assigned U. S Patent Application Publication No. 2017/0171941, published Jun. 15, 2017, and U.S. Patent Application Publication No. 2018/0168019, published Jun. 14, 2018, both entitled LOAD CONTROL SYSTEM HAVING A VISIBLE LIGHT SENSOR, the entire disclosures of which are hereby incorporated by reference.

In addition, the occupant counting sensor described herein (e.g., the occupant counting sensor 500 or the occupant counting sensor 600) may comprise a time-of-flight sensing circuit. In addition to providing X-Y coordinates, the time-of-flight sensing circuit may also provide a Z-coordinate of an occupant in a coverage area (e.g., Z-coordinate may indicate the distance from the occupant counting sensor to the occupant). The X-Y-Z coordinates of the occupant may indicate a location of the occupant in the coverage area and thus may be used to track movements of the occupant in a similar manner as described herein. Therefore, the techniques described above regarding tracking a moving object through multiple zones in order to determine the entry, exit or idle status of the moving object (e.g., as depicted in FIGS. 7A and 7B) may be equally applicable to an occupant counting sensor comprising a time-of-flight sensing circuit.

The accuracy of the occupant counting sensors described herein may be affected by numerous factors. For example, multiple people walking side by side through a doorway, close following each other through the doorway, or standing by the doorway may confuse the occupant counting sensor. The occupant counting sensor may also be subject to false trip interference caused by one or more components of the occupant counting sensor. To prevent and/or reduce the impact of these factors over time, e.g., to prevent any miscount from persisting or propagating into a different time period, the occupant counting sensor may be configured to reset its occupant counter periodically.

In examples, the occupant counting sensor may be configured to reset the occupant count (e.g., a sensor occupant count) maintained by the sensor upon transmitting the count to another device (e.g., to a system controller), upon persisting the count to memory, etc. For example, the system controller may maintain a room occupant count in response to receiving the sensor occupant count from the occupant counting sensor.

Resetting the occupant count may allow the occupant counting sensor to effectively only report a change in the number of the occupants of a space. To illustrate, the occupant counting sensor may have miscounted that five people entered a room while in fact only four people entered that room. By having the ability to reset the occupant count to zero and effectively only determine/report a change in the number of occupants in the room, the occupant counting sensor may still be able to correctly determine/report the number of people that have left the room after the factor(s) causing the miscount have been removed or corrected.

As described herein, an occupant counting sensor (e.g., the occupant counting sensor 190, the occupant counting sensor 200, the occupant counting sensor 300, the occupant counting sensor 500, and/or the occupant counting sensor 600) may report an occupant count or a change thereof to another device. Such other device may be a system controller (e.g., the system controller 110), another occupant counting sensor (e.g., which perform some or all of the functions of a system controller), etc. The receiving device may be configured to maintain occupant counts (e.g., room occupant counts) for one or more user spaces and adjust these counts based on information received from the transmitting sensor.

Figure 8:
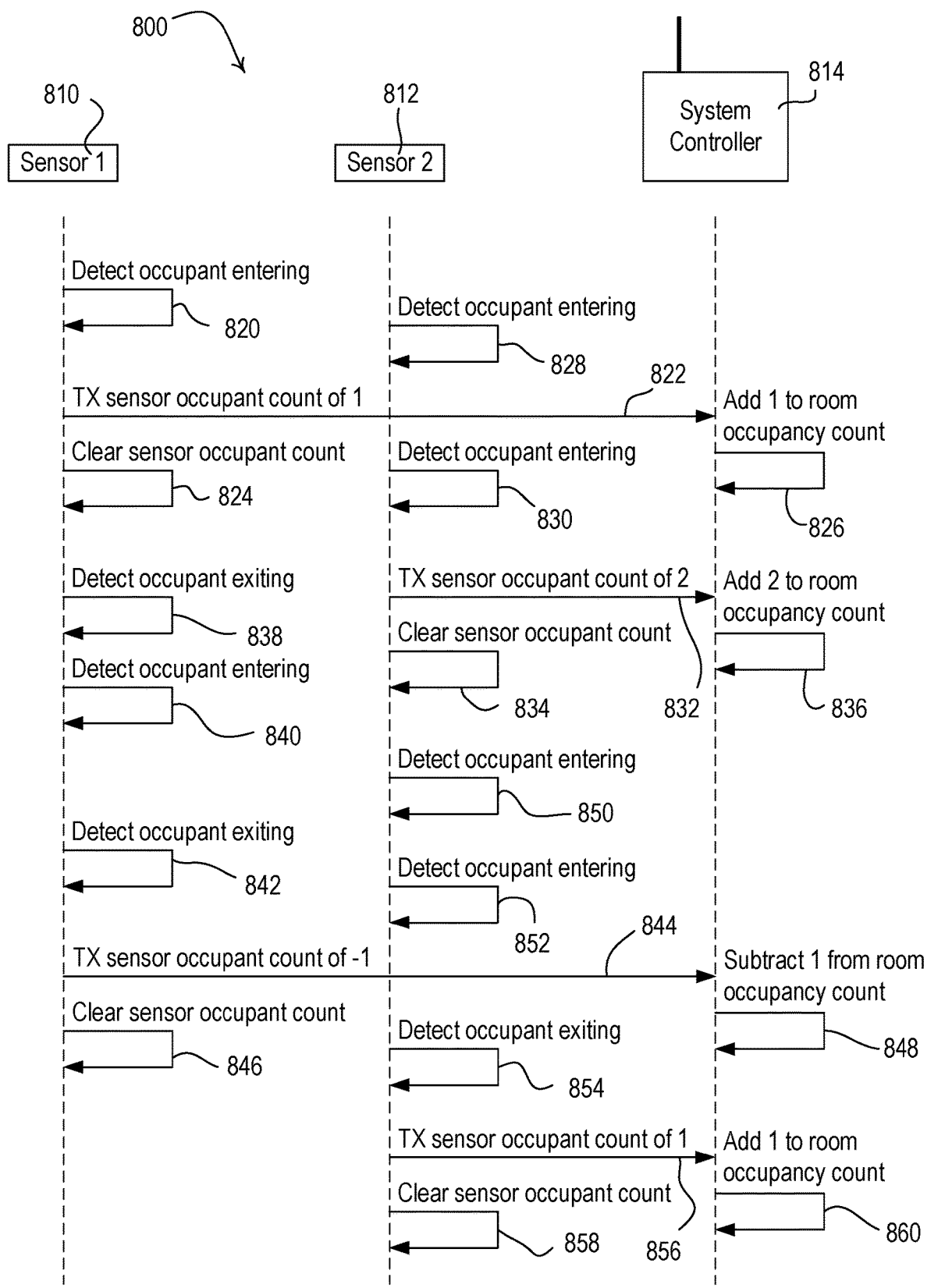
FIG. 8 is a communication sequence diagram depicting example message flows in a system comprising two occupant counting sensors and a system controller.

FIG. 8 is a communication sequence diagram depicting example message flows (e.g., digital message flows) in a system 800 comprising two occupant counting sensors 810, 812 (e.g., the occupant counting sensors 190, 300, 500, 600) and a system controller (e.g., the system controller 110). For example, the occupant counting sensors 810, 812 may be mounted to different doorways and/or entranceways of a room to detect occupant entering and/or exiting the room. The system controller 814 may maintain a room occupant count in response to both of the occupant counting sensors 810, 812. The occupant counting sensor 810, 812 may each transmit (e.g., periodically transmit) a respective sensor occupant count to the system controller 814, where the respective sensor occupant count may indicate a change in the room occupant count since the last transmission of the sensor occupant count.

For example, the first occupant counting sensor 810 may detect an occupant entering the room at 820 and may transmit a sensor occupant count of positive one to the system controller 814 at 822. The first occupant counting sensor 810 may clear its sensor occupant count at 824 (e.g., after transmitting the sensor occupant count at 822). After receiving the sensor occupant count that was transmitted at 822, the system controller 814 may add one to the room occupant count at 826. The second occupant counting sensor 812 may detect an occupant entering the room at 828 and at 830. The second occupant counting sensor 812 may transmit a sensor occupant count of positive two to the system controller 814 at 832 and clear its sensor occupant count at 834. After receiving the sensor occupant count that was transmitted at 832, the system controller 814 may add two to the room occupant count at 836.

The first occupant counting sensor 810 may detect an occupant exiting the room at 838, detect an occupant entering the room at 840, and detect an occupant exiting the room at 842. The first occupant counting sensor 810 may transmit a sensor occupant count of negative one at 844 and clear its occupant count at 846. After receiving the sensor occupant count that was transmitted at 844, the system controller 814 may subtract one from the room occupant count at 848. The second occupant counting sensor 812 may detect an occupant entering the room at 850 and at 852, and detect an occupant exiting the room at 854. The second occupant counting sensor 812 may transmit a sensor occupant count of positive one at 856 and clear its occupant count at 858. After receiving the sensor occupant count that was transmitted at 856, the system controller 814 may add one to the room occupant count at 860.

Figure 9:
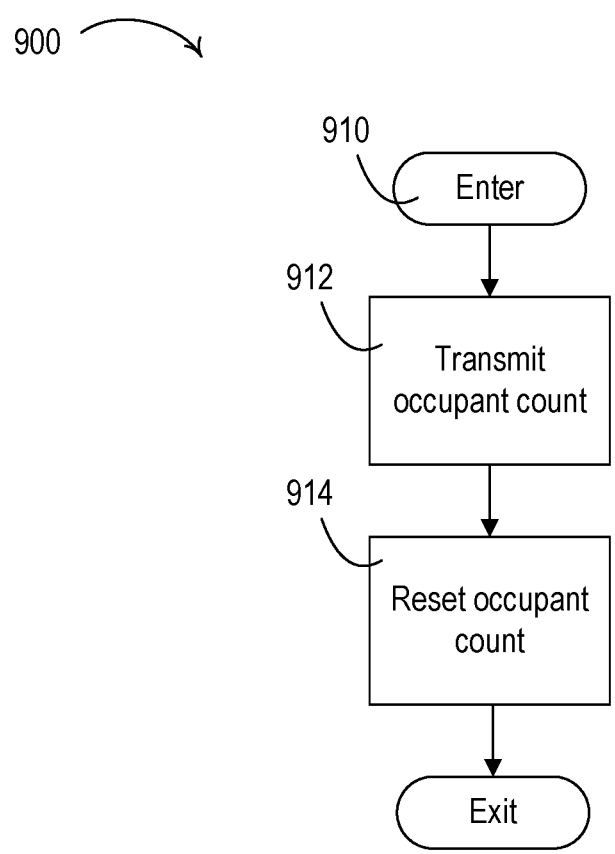
FIG. 9 is a flowchart of an example procedure for resetting an occupant counting sensor.

FIG. 9 shows a flowchart of an example procedure 900 for transmitting and resetting a sensor occupant count at an occupant counting sensor. The procedure 900 may be executed (e.g., periodically) by a control circuit of an occupant counting sensor (e.g., the control circuit 315 of the occupant counting sensor 300 and/or the control circuit 615 of the occupant counting sensor 600) at 910. At 912, the control circuit may transmit the occupant count maintained by the occupant counting sensor to another device (e.g., to the system controller, to another occupant counting sensor, to another device of the load control system the sensor belongs to, etc.), before the procedure 900 exits. Subsequent to the transmission, the control circuit may reset the occupant count to zero at 914 such that the counting of occupants can start anew.

Figure 10:
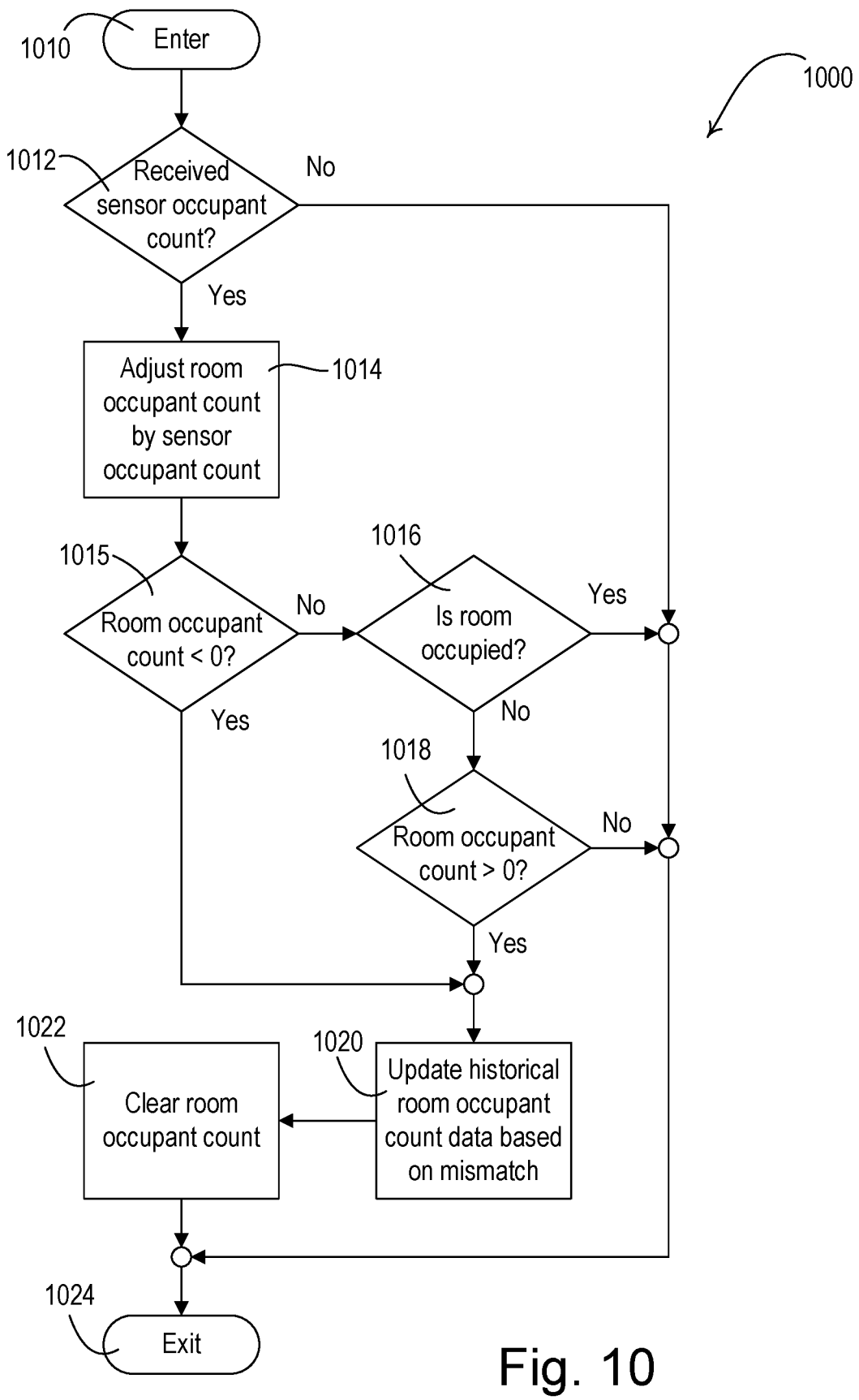
FIG. 10 is a flowchart of an example occupant count receiving procedure.

FIG. 10 shows a flowchart of an example occupant count receiving procedure 1000. The example receiving procedure 1000 may be executed by a receiving device such as a system controller (e.g., the system controller 110), the control circuit of another occupant counting sensor (e.g., the control circuit 315 of the occupant counting sensor 300 and/or the control circuit 615 of the occupant counting sensor 600), and/or the like, at 1010. At 1012, the receiving device may receive occupant count information (e.g., a sensor occupant count) from an occupant counting sensor such as the occupant counting sensor 200 or occupant counting sensor 600 relating to the number of people occupying a certain user space or a change thereof. The occupant count information may be included in one or more digital messages and be transmitted to the receiving device via a wired or wireless communication link, for example, as described herein.

The receiving device may keep an overall occupant count (e.g., a room occupant count) for the user space and may additionally maintain historical room occupant data for the user space. The historical room occupant data may, for example, include respective room occupant counts associated with various points (e.g., various time periods) in time. In response to receiving the occupant count information from the occupant count sensor, the receiving device may adjust the overall occupant counter for the user space at 1014 based on the received information. For example, the receiving device may increase the overall occupant count when a positive occupant count is received from the occupant count sensor, and may decrease the overall occupant count when a negative occupant count is received from the occupant count sensor. The receiving device may further maintain the overall occupant counter when the occupant count from the occupant count sensor is zero.

The receiving device may be capable of correcting any miscount of occupants based on other information acquired by the receiving device. For example, at 1015, the receiving device may determine if the room occupant count is less than zero. If the determination at 1015 is that the room occupant count is less than zero, the receiving device may decide that there is a mistake in the counting, and may correct the mistake. For example, the receiving device may, at 1020, update the historical room occupant count data for the user space by adding the miscounted value to each relevant data point (e.g., each occupant count associated a respective time period). Additionally, the receiving device may clear the overall occupant counter by resetting it to zero at 1022. The receiving device may then exit the procedure 1000 at 1024.

At 1016, the receiving device may determine, based on information received from an occupancy sensor installed in the user space (e.g., the occupancy sensor 180), whether the user space is occupied. If the determination at 1016 is that the user space is unoccupied but the overall occupant counter for the user space is determined at 1018 to be greater than zero, the receiving device may decide that there is a mistake in the counting, and may correct the mistake. For example, the receiving device may, at 1020, update the historical room occupant count data for the user space by subtracting the miscounted value from each relevant data point (e.g., each occupant count associated a respective time period). Additionally, the receiving device may clear the overall occupant counter by resetting it to zero at 1022. The receiving device may then exit the procedure 1000 at 1024.

If the determination at 1016 is that the user space is occupied and the overall occupant counter for the user space is determined at 1018 to be greater than zero, the receiving device may decide that there is no mistake in the counting, and may exit the procedure 1000 at 1024. And receiving device may also exit the procedure 1000 upon determining, at 1012, that no occupant count has been received.

As described herein, the receiving device may be configured to receive occupant count information from more than one occupant counting sensor (e.g., when the user space has multiple doorways each monitored by a sensor). In those scenarios, the receiving device may be capable of integrating the occupant count information received from the multiple sensors and adjust the overall occupant counter for the user space accordingly.

Figure 11:
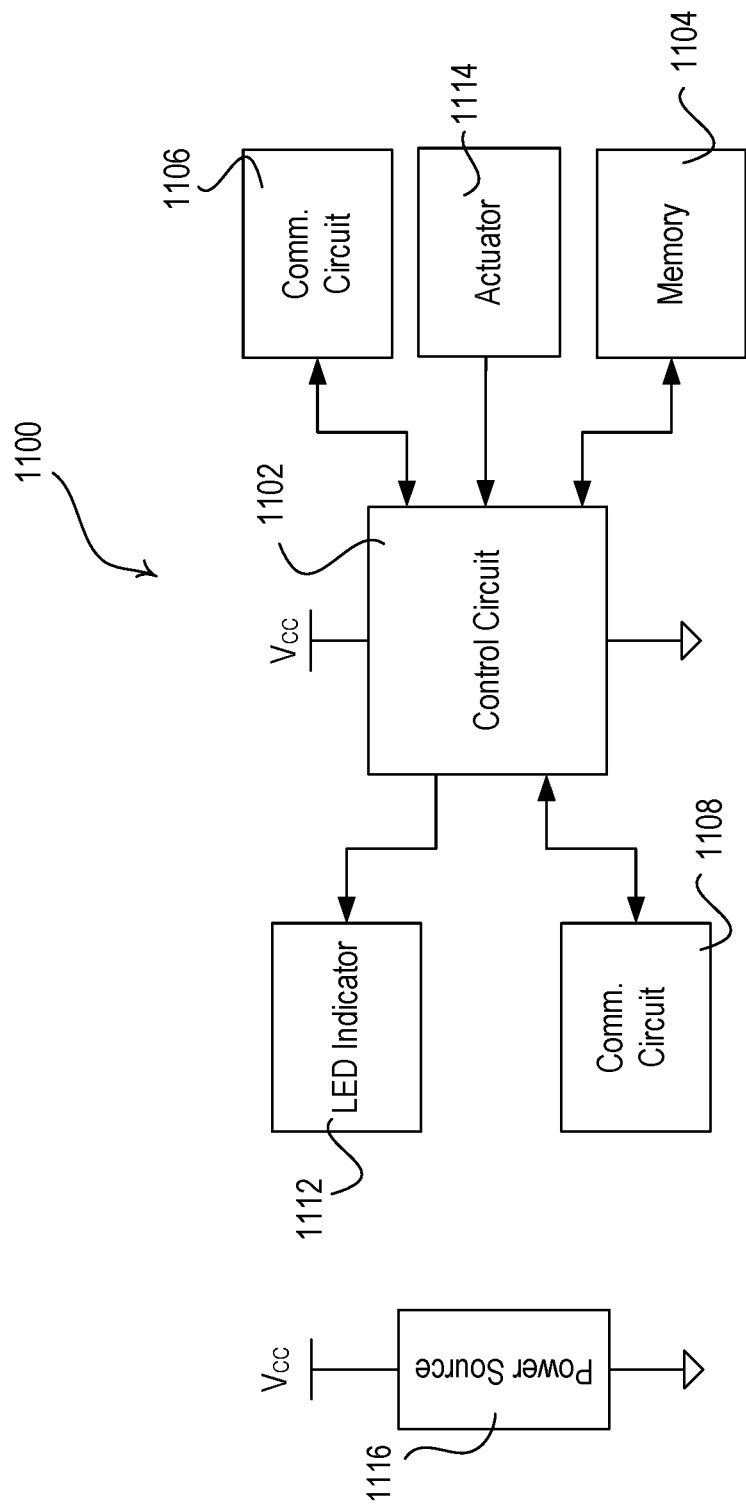
FIG. 11 is an example block diagram of a system controller configured to receive occupant count information transmitted by an occupant counting sensor.

FIG. 11 is a block diagram illustrating an example system controller 1100 (such as system controller 111, described herein) that may be configured to execute the procedure 1000. The system controller 1100 may include a control circuit 1102 for controlling the functionality of the system controller 1100 including executing the procedure 1000. The control circuit 1102 may include one or more general purpose processors, special purpose processors, conventional processors, digital signal processors (DSPs), microprocessors, integrated circuits, a programmable logic device (PLD), application specific integrated circuits (ASICs), or the like. The control circuit 1102 may perform signal coding, data processing, image processing, power control, input/output processing, or any other functionality that enables the system controller 1100 to perform the functions described herein. The control circuit 1102 may store information in and/or retrieve information from a memory 1104. The memory 1104 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1100 may include a communications circuit 1106 for transmitting and/or receiving information. The communications circuit 1106 may perform wireless and/or wired communications. The system controller 1100 may also, or alternatively, include a communications circuit 1108 for transmitting and/or receiving information. The communications circuit 1108 may perform wireless and/or wired communications. Communications circuits 1106 and 1108 may be in communication with control circuit 1102. The communications circuits 1106 and 1108 may include RF transceivers or other communications modules capable of performing wireless communications via an antenna. The communications circuit 1106 and communications circuit 1108 may be capable of performing communications via the same communication channels or different communication channels. For example, the communications circuit 1106 may be capable of communicating (e.g., with a network device, over a network, etc.) via a wireless communication channel (e.g., BLUETOOTH®, near field communication (NFC), WIFI®, Thread, WI-MAX®, cellular, etc.) and the communications circuit 1108 may be capable of communicating (e.g., with control devices and/or other devices in the load control system) via another wireless communication channel (e.g., WI-FI® or a proprietary communication channel, such as CLEAR CONNECT™).

The control circuit 1102 may be in communication with an LED indicator 1112 for providing indications to a user. The control circuit 1102 may be in communication with an actuator 1114 (e.g., one or more buttons) that may be actuated by a user to communicate user selections to the control circuit 1102. For example, the actuator 1114 may be actuated to put the control circuit 1102 in an association mode and/or communicate association messages from the system controller 1100.

Each of the modules within the system controller 1100 may be powered by a power source 1116. The power source 1116 may include an AC power supply or DC power supply, for example. The power source 1116 may generate a supply voltage $V_{CC}$ for powering the modules within the system controller 1100.

Although features and elements are described herein in particular combinations, each feature or element can be used alone or in any combination with the other features and elements. For example, the functionality described herein may be described as being performed by a control device, such as a remote control device or a lighting device, but may be similarly performed by a hub device or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A device configured to detect and track an occupant entering or exiting a space, the device comprising:
   a detection circuit configured to detect the occupant in a coverage area of the space and generate one or more signals indicating a location of the occupant in the coverage area; and
   a control circuit configured to:
      receive the one or more signals from the detection circuit;
      generate an occupant map that indicates the location of the occupant;
      determine the location of the occupant based on coordinates of the occupant in the occupant map;
      determine movements of the occupant through a plurality of zones of the coverage area based on the one or more signals, wherein the plurality of zones comprises a first zone, a second zone, and a third zone, the first zone comprising an area outside of the space and adjacent to an entry location of the space, the second zone comprising an area at the entry location, and the third zone comprising an area inside of the space and adjacent to the entry location; and
      determine that the occupant has entered the space in response to a determination that the occupant has moved from the first zone to the third zone through the second zone; and
      determine that the occupant has exited the space in response to a determination that the occupant has moved from the third zone to the first zone through the second zone.

2. The device of claim 1, wherein the control circuit comprises a Kalman tracking filter, the control circuit configured to determine the coordinates of the occupant using the Kalman tracking filter.

3. The device of claim 2, wherein the control circuit is configured to determine preliminary coordinates of the occupant in the occupant map based on the one or more signals received from the detection circuit, and to adjust the preliminary coordinates using the Kalman tracking filter.

4. The device of claim 1, wherein the detection circuit comprises a thermopile array having a plurality of heat-sensitive elements.

5. The device of claim 4, wherein the one or more signals generated by the detection circuit comprise a two-dimensional (2D) thermal image of the coverage area and wherein the location of the occupant in the coverage area is indicated in the thermal image.

6. The device of claim 1, wherein the detection circuit comprises a visible light sensing circuit having a camera.

7. The device of claim 6, wherein the one or more signals generated by the detection circuit comprise a two-dimensional (2D) image of the coverage area and wherein the location of the occupant in the coverage area is indicated in the image.

8. The device of claim 1, wherein the detection circuit comprises a radar sensing circuit.

9. The device of claim 8, wherein the one or more signals generated by the detection circuit comprise a two-dimensional (2D) occupant map of the coverage area and wherein the location of the occupant in the coverage area is indicated in the occupant map.

10. The device of claim 1, wherein the control circuit comprises a tracking filter, the control circuit configured to determine the coordinates of the occupant using the tracking filter.

11. The device of claim 10, wherein the control circuit is configured to determine preliminary coordinates of the occupant in the occupant map based on the one or more signals received from the detection circuit, and to adjust the preliminary coordinates using the tracking filter that the occupant has exited the space in response to determining that the occupant has moved through the plurality of zones in a second order.

12. The device of claim 1, wherein the control circuit is further configured to determine that the occupant has entered an idle state based on a lack of movements of the occupant or in response to a loss of detection of the occupant.

13. The device of claim 12, wherein the control circuit is configured to determine that the occupant has entered the idle state based on a lack of movements of the occupant during a preconfigured time period.

14. The device of claim 13, wherein the control circuit is configured to assign an identifier to the occupant in response to detecting that the occupant has entered one of the plurality of zones from the idle state, the control circuit further configured to use the identifier to track the movements of the occupant through the plurality of zones.

15. The device of claim 14, wherein the control circuit is configured to disassociate the occupant with the identifier in response to detecting that the occupant has moved from one of the plurality of zones into the idle state.

16. The device of claim 1, wherein the control circuit is further configured to maintain an occupant count for the space, the control circuit configured to increase the occupant count in response to determining that the occupant has entered the space, and to decrease the occupant count in response to determining that the occupant has exited the space.

17. The device of claim 16, further comprising a communication circuit, wherein the control circuit is configured to transmit a message indicating the occupant count via the communication circuit.

18. The device of claim 17, wherein the control circuit is further configured to reset the occupant count to zero after the message is transmitted.

19. The device of claim 17, wherein the message is transmitted to a controller external to the device.

20. The device of claim 16, further comprising a communication circuit configured to receive a signal from an occupancy sensor indicating an occupancy condition of the space.

21. The device of claim 20, wherein the control circuit is further configured to set the occupant count to zero when the signal received from the occupancy sensor indicates that the space is unoccupied.

22. The device of claim 16, wherein the control circuit is further configured to maintain historical data indicating respective occupant counts of the space during various time periods.

23. An occupant detection device, comprising:
- a detection circuit configured to detect an occupant in a coverage area of a space and generate an image of the coverage area indicating a location of the occupant in the coverage area; and
- a control circuit responsive to the detection circuit and configured to:
  - determine the location of the occupant based on coordinates of the occupant in an occupant map; and
  - determine movements of the occupant through a plurality of zones in the coverage area based on the image and determine a count of a number of occupants in the space based on the movements of the occupant in the coverage area, wherein the plurality of zones comprises a first zone, a second zone, and a third zone, the first zone comprising an area outside of the space and adjacent to an entry location of the space, the second zone comprising an area at the entry location, and the third zone comprising an area inside of the space and adjacent to the entry location;

wherein the control circuit is configured to increase the count of the number of occupants in the space when the movements of the occupant indicates that the occupant has moved from the first zone to the third zone through the second zone to enter the space, the control circuit further configured to decrease the count of the number of occupants in the space when the movements of the occupant indicates that the occupant has moved from the third zone to the first zone through the second zone to exit the space.

24. The occupant detection device of claim 23, wherein the detection circuit comprises a thermopile array and the image comprises a two-dimensional (2D) thermal image of the coverage area.

25. The occupant detection device of claim 24, wherein the thermopile array comprises a plurality of heat-sensitive elements.

26. The occupant detection device of claim 23, wherein the control circuit comprises a Kalman tracking filter, the control circuit configured to determine coordinates of the occupant in the image using the Kalman tracking filter.

27. The occupant detection device of claim 26, wherein the control circuit is configured to generate the occupant map based on the image generated by the detection circuit.

* * * * *